(12) United States Patent
Purnadi et al.

(10) Patent No.: US 8,750,181 B2
(45) Date of Patent: Jun. 10, 2014

(54) MAINTAINING MBMS CONTINUITY

(75) Inventors: Rene Purnadi, Irving, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 102 days.

(21) Appl. No.: 13/471,144

(22) Filed: May 14, 2012

(65) Prior Publication Data

US 2013/0301509 A1  Nov. 14, 2013

(51) Int. Cl.
*H04B 7/00* (2006.01)
*H04W 36/00* (2009.01)

(52) U.S. Cl.
CPC ................... *H04W 36/0033* (2013.01)
USPC .......................................................... 370/310

(58) Field of Classification Search
CPC ............. H04W 36/0005; H04W 36/0011; H04W 36/0016–36/0033
USPC ......... 370/310, 312, 328, 331, 332, 390, 464, 370/465; 455/422, 436–442
See application file for complete search history.

(56) References Cited

U.S. PATENT DOCUMENTS

| | | | |
|---|---|---|---|
| 8,254,932 B2 * | 8/2012 | Hsu .............................. | 455/436 |
| 2011/0305183 A1 * | 12/2011 | Hsu et al. ...................... | 370/312 |
| 2012/0236776 A1 * | 9/2012 | Zhang et al. .................. | 370/312 |
| 2013/0039250 A1 * | 2/2013 | Hsu .............................. | 370/312 |
| 2013/0051298 A1 * | 2/2013 | Drevo .......................... | 370/312 |
| 2013/0051306 A1 * | 2/2013 | Gou et al. ..................... | 370/312 |
| 2014/0029580 A1 * | 1/2014 | Jung et al. .................... | 370/331 |

FOREIGN PATENT DOCUMENTS

WO  2008/135933  11/2008

OTHER PUBLICATIONS

3GPP TS 25.346 v10.0.0 (Mar. 2011) standard, 3GPP, Mar. 2011, pp. 1-71.*
Service Continuity scenario analysis, 3GPP TSG RAN WG2 #73bis,R2-111925, 3GPP, Apr. 2011, pp. 1-4.*
Service continuity support for RRC connected UE, 3GPP TSG RAN WG2 Meeting #74, R2-113135,3GPP, May 2011, pp. 1-3.*
Text proposal for MBMS service continuity, 3GPP TSG RAN, WG3 #55bis, R3-070712, 3GPP, Mar. 2007, pp. 1-4.*
Alcatel-Lucent Shanghai Bell, Alcatel-Lucent; "Service Continuity Support for RRC Connected UE"; 3GPP TSG-RAN WG2 Meeting #74 (R2-113135); Barcelona, Spain; May 9-13, 2011; 3 pages.
Catt; "Clarification on MBMS Service Continuity"; 3GPP TSG RAN WG2 Meeting #73bis (R2-111843); Shanghai, China; Apr. 11-15, 2011; 3 pages.

(Continued)

*Primary Examiner* — Dmitry H Levitan
(74) *Attorney, Agent, or Firm* — Fish & Richardson P.C.

(57) ABSTRACT

Systems, apparatuses, and computer implemented methods may be directed to identifying that a UE is near a cell edge of the source base station, the UE receiving or requesting a multimedia broadcast multicast service (MBMS). A target base station can be identified based, at least in part, on the MBMS received at or requested by the UE. The target base station can be provided to the UE, for example, by providing an indication to the UE of a target base station from which to receive services. The target base station may be acquired through a handover procedure (RRC connected), or through a cell selection procedure (RRC idle). The target base station can be identified based on a multimedia broadcast single frequency network area identifier (MBSFN AreaID) for a synchronized MBMS continuity across network cells or by a temporary multicast group identity (TMGI) for asynchronous MBMS continuity across network cells.

23 Claims, 10 Drawing Sheets

(56) References Cited

OTHER PUBLICATIONS

Research in Motion UK Limited'; "Enhancing MBMS Service Continuity"; 3GPP TSG RAN WG2 Meeting #74 (R2-113878); Athens, Greece; Aug. 20-24, 2011; 2 pages.

International Search Report and Written Opinion of the International Searching Authority issued in International Application No. PCT/US2013/040929 on Nov. 6, 2013; 15 pages.

* cited by examiner

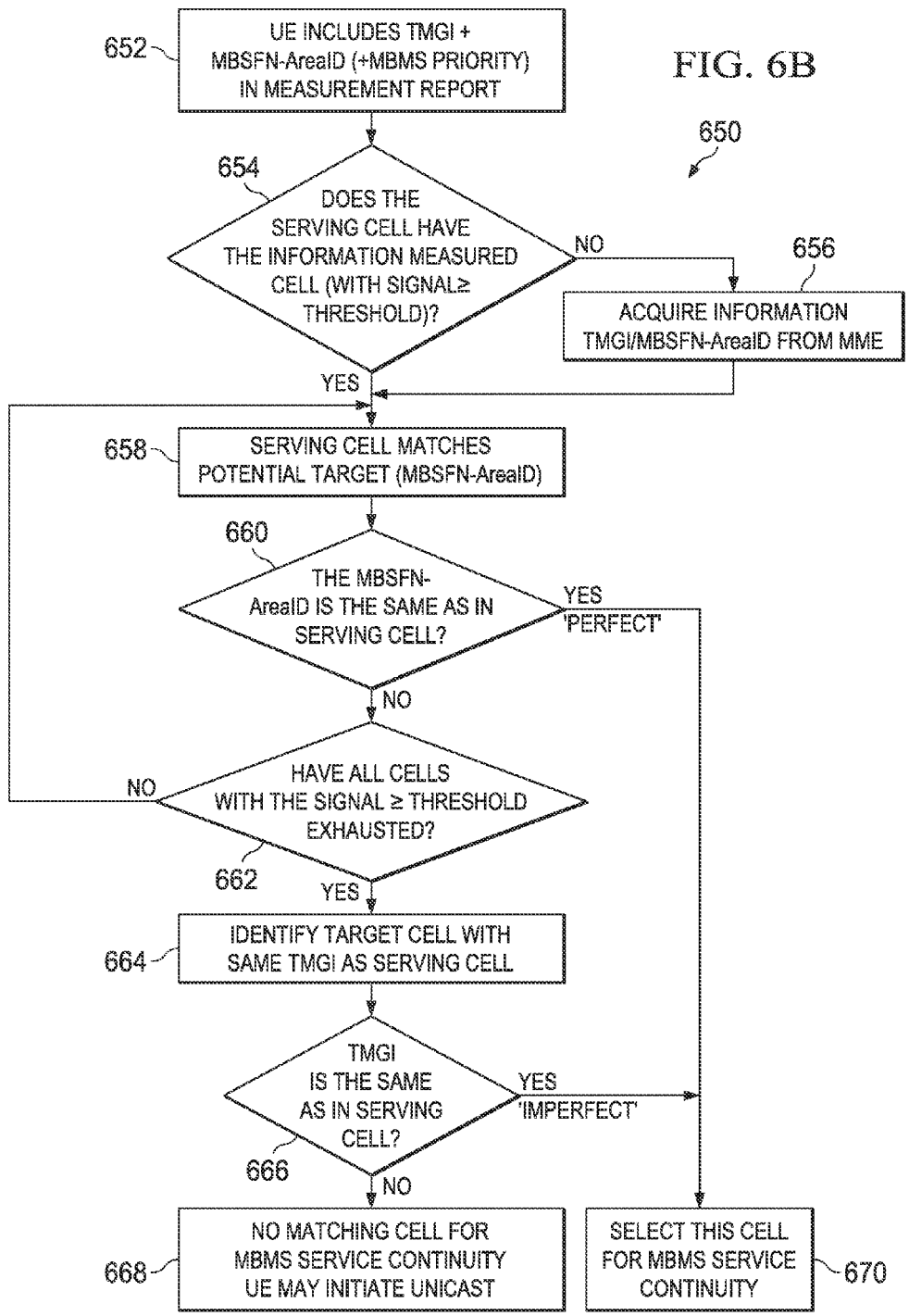

MAINTAINING MBMS CONTINUITY

FIELD

The present disclosure is directed to multimedia broadcast multicast service (MBMS), and more particularly to efficiently maintaining MBMS continuity in Radio Resource Control (RRC) connected and RRC idle modes.

BACKGROUND

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as long-term evolution (LTE). For example, an LTE system might include an Evolved Universal Terrestrial Radio Access Network (E-UTRAN) node B (eNB), a wireless access point, a relay, a remote radio head, or a similar component instead of or in addition to a traditional base station. Any such component may be referred to herein as an eNB, but it should be understood that such a component is not necessarily an eNB. Such a component may also be referred to herein as an access node or base station. Also, the terms "eNB" and "cell" might be used interchangeably herein. And likewise, the term eNB may refer to components of a eNB or other base station, access node, etc.

The following terms and abbreviations may be used throughout this disclosure:
ACK Acknowledgement
BCCH Broadcast Channel
BM-SC Broadcast Multicast Service Center
eNB enhanced Node B
CQI Channel Quality Indicator
CA Carrier Aggregation
DL-SCH Down Link Shared Channel
EPS Enhanced Packet Switch
ESA Emergency Service Announcement
HARQ Hybrid ARQ (Automatic Repeat reQuest)
HO Handover
LTE Long Term Evolution
M2AP M2 interface Application Protocol
M3AP M3 interface Application Protocol
MCCH MBMS Control Channel
MCH MBMS Channel
MCS Modulation Coding Scheme
MBMS Multimedia Broadcast Multicast Service
MBMS-GW MBMS Gateway
MBSFN MBMS Single Frequency Network
MME Mobility Management Entity
MSP MBMS Service Period
NACK Negative Acknowledgement
p-t-m point to multi-points
p-t-p point to point
RLC Radio Link Controller
RRC Radio Resource Controller
S1AP S1 interface Application Protocol
SAI Service Area Identifier
SINR Signal to Interference plus Noise Ratio
TMGI Temporary Multicast Group Identity
UE User Equipment
UM Unacknowledged Mode
X2AP X2 interface Application Protocol

DESCRIPTION OF THE DRAWINGS

FIG. 6B is a process flowchart showing an example process to handover the target cell to provide MBMS continuity for an RRC Connected UE.

DETAILED DESCRIPTION

Figure 1A:
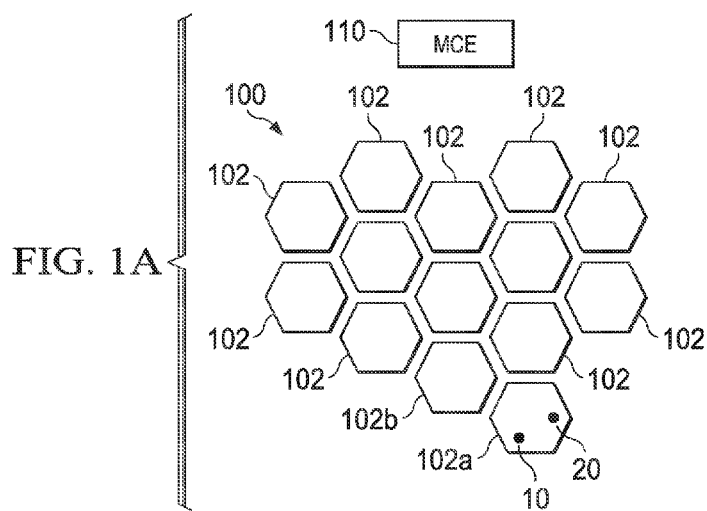
FIG. 1A is a schematic diagram of an example network according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure includes systems, methods, and network elements that can specify mechanisms to facilitate the network to provide continuity of the service(s) provided by MBSFN in deployment scenarios involving one or more frequencies, to specify cell selection/reselection mechanisms in order to facilitate the UE to receive the desired MBMS service(s) in RRC Idle mode, to specify the signaling mechanisms to facilitate the network to provide continuity of the desired MBMS service(s) reception in RRC Connected mode, to provide the related MCE functionality for the above mechanisms, and to study and specify some approaches for introducing location information relevant to a service so the UE may select, whether or not to receive and decode a service.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells in the same or different carriers. When multiple cells overlap, a UE within the overlapped region can receive transmissions from multiple eNBs. When a UE receives substantially identical data from a plurality of eNBs, the transmissions from the eNBs can augment one another to provide a signal of significantly higher quality than would be the case if only one eNB were transmitting the signal. That is, a higher signal-to-interference-plus-noise ratio can be achieved when substantially the same data is transmitted at substantially the same time on substantially the same resource with substantially the same modulation and coding. A set of cells in which a plurality of substantially identical signals are present is known as a single frequency network, or SFN. If an MBMS is being transmitted with substantially identical signals in a set of cells, the set of cells can be referred to a multicast/broadcast SFN (MBSFN).

The aim of MBMS service continuity is to allow a network to direct a UE that is receiving or interested to receive a MBMS session in RRC Connected mode to a target cell where the UE can receive or continue to receive the same MBMS session, and for UE in RRC Idle mode to select/reselect a cell where the UE can receive or continue to receive the desired MBMS service. The analysis above indicates that a "perfect" MBMS service continuity, either through handover in RRC Connected mode or cell reselection in RRC Idle mode can only occur if the target cell is within the same MBSFN area.

Certain aspects of the disclosure are directed to systems, methods, and or apparatuses of a wireless communications network that execute instructions. It may be identified that a user equipment (UE) is near a cell edge of a source base station, the UE receiving a multimedia broadcast multicast service (MBMS). A target base station may be identified based, at least in part, on the MBMS. For example, the source base station may identify a target base station from among one or more neighboring base stations based on MBMS identifiers of the neighboring base stations. The target base station is identified to the UE. The target base station can be a base station associated with a coverage area neighboring the source base station's coverage area. A UE crossing the boundary between two neighboring cells is handed over from the source base station to the target base station.

In certain implementations, the UE is in RCC connected mode, and the method further may include initiating a handover procedure for the UE to the target cell. In certain implementations, the UE is in RCC idle mode, and the method further may include initiating a cell selection procedure for the UE to select the target cell.

In certain implementations, identifying that UE user equipment is near the cell edge may include receiving a measurement report from the UE. In certain implementations, the measurement report includes a temporary multicast group identity (TMGI) indicator. In certain implementations, the measurement report includes an MBSFN area identifier (MBSFN-AreaID). In certain implementations, the measurement report includes an identification of a cell that has the same MBSFN-AreaID as the UE that is receiving the MBMS service.

In certain implementations, identifying the target cell based, at least in part, on the MBMS may include receiving a MBSFN area identifier (MBSFN-AreaID) from the UE. One or more base stations can be identified that have the same MBSFN-AreaID received from the UE. The target base station can be identified from among the identified one or more cells based, at least in part, on a signal strength of the target cell.

In certain implementations, identifying the target cell based, at least in part, on the MBMS may include sending a MBSFN area identifier (MBSFN-AreaID) of one or more neighboring cells to the UE. An identification of one or more base stations that have the same MBSFN-AreaID can be received from the UE. The target cell can be identified or selected from among the identified one or more neighboring cells based, at least in part, on a signal strength of the one or more neighboring cells and the MBSFN-AreaID.

In certain implementations, identifying the target base station based, at least in part, on the MBMS may include receiving a temporary multicast group identity indicator (TMGI) from the UE. One or more base stations can be identified that have the same TMGI indicator received from the UE. The target base station can be selected from among the identified one or more cells based, at least in part, on a signal strength of the target cell.

In certain implementations, identifying the target base station based, at least in part, on the MBMS may include initiating an MBMS query procedure to identify the target base station based, at least in part, on an MBMS service identifier.

In certain implementations, identifying the target cell based, at least in part, on the MBMS may include initiating an MBMS query procedure to identify one or more cells based, at least in part, on a temporary multicast group identity (TMGI) similar to or the same as a TMGI of the serving cell and the proximity of the target cell relative to the serving cell.

In certain implementations, providing the target cell to the UE may include providing a temporary multicast group identity indicator (TMGI) of the target cell to the UE.

In certain implementations, identifying the target cell based, at least in part, on the MBMS may include initiating an MBMS query procedure to identify one or more cells based, at least in part, on a MBSFN area identifier (MBSFN-AreaID) similar to or the same as an MBSFN-AreaID of the serving cell and the proximity of the target cell relative to the serving cell.

In certain implementations, providing the target cell to the UE may include providing a MBSFN area identifier (MBSFN-AreaID) of the target cell to the UE.

Certain aspects of the disclosure are directed to systems, methods, and apparatuses that execute instructions. For example, certain aspects are directed to user equipment (UE) that include a transceiver, a memory, and hardware processors for executing instructions, such as communicating a measurement report to a first base station, the measurement report including an indication of a multimedia broadcast multicast service (MBMS) provided to the UE by the first base station. A message may be received from the first base station, the message including an identifier of a second base station.

In certain implementations, the message is a radio resource controller (RRC) connection reconfiguration message. The message may include a start time associated with the MBMS. The message may include an indication of an MBMS service available for the UE from the second base station.

In certain implementations, the indication of the MBMS is a multimedia broadcast single frequency network area identifier (MBSFN-AreaID). In certain implementations, the indication of the MBMS is a temporary multicast group identity (TMGI).

In certain implementations, the MBMS identifier for the UE is a temporary multicast group identity (TMGI). In certain implementations, the MBMS identifier for the UE is a multimedia broadcast single frequency network area identifier (MB SFN-AreaID). In certain implementations, wherein receiving a message from the first base station comprises receiving a message that includes a TGMI of a second base station.

In certain implementations, receiving a message from the first base station may include receiving a message that includes an MBSFN-AreaID of a second base station.

In certain implementations, the instructions may include identifying one or more neighboring base stations that transmit the same MBMS identifier received from the first base station as the UE. A base station can be identified from among the one or more neighboring base stations having the same MBMS identifier based, at least in part, on a signal strength of the target cell to be included in the measurement report.

Certain aspects of the disclosure are directed to systems, methods, and apparatuses of a wireless communications network. For example, a network element, such as an MME, may execute instructions or perform a method that includes certain steps, such as receiving an indication from a first base station of multimedia broadcast multicast service (MBMS) identifier associated with a MBMS for a user equipment. A second base station neighboring to the first base station can be identified, the second base station providing the MBMS provided by the indication from the first base station. The second base station can be provided to the first base station (e.g., an identifier and other information associated with the second base station can be provided to the UE so that the UE can take certain steps and/or connect to the second base station).

In certain implementations, the MBMS identifier is a temporary multicast group identity (TMGI). In certain implementations, the MBMS identifier is a multimedia broadcast single frequency network area identifier (MB SFN-AreaID).

In certain implementations, providing the second base station to the first base station may include providing a TMGI of the second base station to the first base station.

In certain implementations, providing the second base station to the first base station may include providing a MBSFN-AreaID of the second base station to the first base station.

In certain implementations, identifying a second base station may include identifying one or more base stations having a TMGI matching the TMGI of the first base station.

In certain implementations, identifying a second base station may include identifying one or more base stations having a MBSFN-AreaID matching the MBSFN-AreaID of the first base station.

In certain implementations, identifying a second base station comprises identifying one or more base stations providing the MBMS of the first base station.

A serving cell may not be able to select a target cell that has a similar MBMS session that a UE is currently receiving, in order to provide continuity of the MBMS service(s) to the UE, because the serving cell may not know the MBMS session(s) and its corresponding MBSFN(s)/TMGI(s) that the UE is receiving and it does not know the MBSFN(s)/TMGI(s) of the neighboring cell(s) without inquiring the neighboring cells' MBSFN(s)/TMGI(s). An RRC idle UE may not be able to select a target cell that is in the same MBSFN area in order to continue the MBMS service. The assistance information described in the present disclosure can at least partially resolve this issue by, for example, allowing the UE to select a target cell that provides the same MBMS service, but it is not necessarily multicast in sync with the serving cell. As used herein, the term serving cell can refer to a cell that provides service to a UE prior to handover to a neighboring or target cell, or can refer to a cell in which an RRC idle mode UE is in prior to moving to a neighboring cell. The service cell may be referred to by other terms, such as source cell or serving eNB. The UE knows what it is receiving and the MME knows the information about neighboring cells. This disclosure is directed to allowing the source eNB to know which neighboring eNB is part of the MBSFN(s)/TMGI(s) that provide the same MBMS service(s), so it can handover the UE to the appropriate target eNB/cell. For RRC-Idle UEs, the UE must acquire the BCCH of the candidate cell to know the MBSFN and acquire the MCCH of the candidate cell to know the TMGI(s), and may select a target cell that provide the same MBMS service under different MBSFN area in case the idle UE cannot find a suitable neighboring cell within the same MBSFN area. In case UE is at the edge of an MBSFN and the neighboring cell does not provide the same MBMS service(s), the source eNB/cell can add more robust p-t-p transmission to deliver the MBMS service and combine the p-t-m and p-t-p MBMS transmission for error free MBMS content in RLC layer. Alternatively, the source eNB/cell can handover the p-t-m MBMS session as p-t-p MBMS session in the target eNB/cell, so the MBMS service continuity can be achieved. In case of more than one MBSFN(s) overlap in a cell and the UE can receive MBMS services from more than one MBSFN(s), the UE can handover some of the MBMS service(s) with its corresponding TMGI(s) in unicast transmission and handover the rest of the MBMS service(s) with its corresponding TMGI(s) in multicast transmission.

To facilitate MBMS service continuity, a UE in RRC-Idle state can be assisted by the SAI and its corresponding frequency information in the serving cell broadcast channel. When the UE finds a cell with the SAI and its corresponding frequency indicating it is transmitting the MBMS service that the UE is receiving or interested to receive, the UE may move to that cell and acquire the broadcast channel. Based, at least in part, on the broadcast channel, the UE can know the MBSFN-AreaID of that cell, and the UE can know whether this cell belongs to the same MBSFN area with the previous serving cell. If the MBSFN-AreaID is not the same, the UE may not have an MBMS service continuity because the MBMS service is provided by a cell from a different MBSFN area which is not synchronized. The UE may go to the next cell that also has the same SAI with its corresponding frequency, and repeat the procedure, until the same MBSFN area is found. The MBSFN-AreaID or TMGI of the serving cell and its neighboring cells in the broadcast channel can also assist the UE, in addition to the SAI and its corresponding frequency.

Adding an MBMS identifier, such as the MBSFN-AreaID or the TMGI, can increase the efficiency of identifying a cell for the UE to maintain MBMS continuity. The UE may have prior knowledge about the SAI and the corresponding MBMS service, distributed by the application layer. On the other hand, the UE may not have prior knowledge of the MBSFN-AreaID because the MBSFN-AreaID is radio layer parameter dynamically assigned by the BM-SC and MCE. The SAI and its corresponding frequency are useful for the UE to find and initiate the MBMS service. The assistance from SAI with the corresponding frequency, however, is not enough to guarantee that the target cell is belong to the same MBSFN. Once the UE has been receiving the service, it knows the MBSFN-AreaID and only needs this MBSFN-AreaID to assure the target cell belongs to the same MBSFN area that is transmitting the same MBMS service in sync.

For RRC-Connected UEs, the serving cell may not know which MBMS service that a UE is receiving or interested to receive because the serving eNB does not maintain a UE-MBMS context as it would in Universal Mobile Telecommunications System (UMTS). The RRC_Connected UE can inform the serving cell the MBSFN-AreaID of the MBMS service that it is currently receiving. When the serving cell hands-over a UE to a target cell, the decision is based on the measurement report from the UE, the serving cell does not take into account the MBMS service that the UE is receiving. The target cell may or may not belong to the same MBSFN that can provide a perfect MBMS service continuity for a UE. To facilitate an MBMS service continuity, the UE can handover to a target cell that belongs to the same MBSFN area. The UE can let the serving cell know an MBMS identifier that is related to the MBMS service, such as the MBSFN-AreaID (assuming that in the future a cell may belong to more than one MBSFN area) or TMGI (that may be valid in more than one MBSFN area), that the UE is currently receiving, which allows the serving cell select the target cell for the UE that can provide MBMS service continuity; or the UE knows the MBMS identifier, such as the MBSFN-AreaID or TMGI, of the measured cell and send measurement report containing only the preferred cell(s) that belongs to the same MBSFN area, which allows the UE to make the preference of the target cell by only reporting the preferred cell(s) in the measurement report.

FIG. 1A is a schematic diagram of an exemplary network 100 according to an embodiment of the disclosure. The network 100 may include a plurality of cells 102. Each of the cells 102 represents a coverage area for providing wireless telecommunication services of the network 100 via an access node. In some cases, the cells 102 might be referred to by other names, such as "hotspots". While the cells 102 are depicted as having non-overlapping coverage areas, one or more of the cells 102 may have partially overlapping coverage with adjacent cells. Further, while a particular number of the cells 102 are depicted, a larger or smaller number of the cells 102 may be included in the network 100.

One or more UEs 10 may be present in each of the cells 102. Although only one UE 10 is depicted and is shown only in cell 102a, a plurality of UEs 10 might be present in each of the cells 102. An eNB 20 in each of the cells 102 provides a radio link between the UEs 10 and other components in a telecommunications network. While the eNB 20 is shown only in cell 102a, it should be understood that an eNB would be present in each of the cells 102. Also, access nodes other than the eNBs 20 could be used. The eNBs 20 can communicate with an MBMS control entity (MCE) 110 or a similar network component that can provide centralized or distributed management and coordination among the eNBs 20. The term "UE" can also refer to any hardware or software component that can terminate a communication session for a user. The term "UE" can also refer to any hardware or software component that can terminate a communication session for a user. Also, the terms "user equipment," "UE," "user agent," "UA," "user device," and "mobile device" might be used synonymously herein. As used herein, the terms "user equipment" or "UE" might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances.

Embodiments of the present disclosure facilitate MBMS service continuity for UEs 10 in the network 100. That is, a UE 10 that are receiving an MBMS transmission can continue receiving the MBMS transmission after moving to another cell. For example, the UE 10 in cell 102a might be receiving an MBMS transmission from the eNB 20 in that cell. If the UE 10 then moves to another cell, cell 102b for instance, the UE 10 can continue the MBMS reception that the UE 10 was receiving or was interested in receiving in cell 102a.

MBMS is a point to multipoint (p-t-m) service that allows data from a single source entity to be transmitted to multiple endpoints, using efficient radio resources. The data typically originates from a Broadcast Multicast Service Center (BM-SC) and is sent to one or more eNBs 20. The eNBs 20 may then transmit the data over the air interface to one or more UEs 10. The UE 10 can receive the content of the service substantially simultaneously using radio resources comparable to a unicast transmission to one user. In most cases, the MBMS transmission may be unidirectional, but in some cases, the MBMS transmission could be bi-directional. That is, in most cases, the UE 10 does not have an uplink radio bearer to transmit an acknowledgement/negative acknowledgement (ACK/NACK), to report channel quality (CQI), or to send other information on an uplink.

In certain implementations, such as LTE, the UE 10 receives the available MBMS services from information the UE receives in System Information Block type 13 (SIB 13) in the broadcast channel (BCCH). SIB 13 contains information to acquire the MBMS Control Channel (MCCH). Upon acquiring MCCH, the UE 10 obtains information about the available MBMS services, which carrier, which radio frames and the location of the MCH (MBMS Channel) subframes that carry MCCH change notification, MTCH (MBMS Traffic Channel) or MTCH with ESA (Emergency Service Announcement) content, and other info such as MCH Scheduling Period (MSP), MCS (Modulation and Coding Scheme for MBMS), etc.

UE 10 can acquire the MCCH in the RRC Idle state or in the RRC Connected state. In certain implementations, such as UMTS, when a UE finds an MBMS service of interest, the UE can register to join a multicast service or can join a broadcast service without registering. A broadcast service typically requires no subscription, and a multicast service typically requires a subscription. Through join and leave procedures, the BM-SC typically knows how many users are registering for a multicast service, and may activate and deactivate the service based on the number of users joining and leaving the service. The BM-SC cannot keep track of the number of broadcast users. It should be noted, however, that joining an MBMS service is not necessarily an indication that a UE is receiving the MBMS multicast transmission. In addition, a procedure for counting users in the RRC connected state can help the BM-SC determine how many users in the MBSFN are interested in receiving or are already receiving an MBMS service. The results of the counting procedure can be used by the BM-SC to determine the activation, deactivation, and reactivation status of an MBMS service that is being provided to all the cells in an MBSFN, rather than this information being provided on a per-cell basis. This counting procedure does not include UEs in the RRC Idle state.

Moreover, in certain implementations, such as in LTE, MBMS does not have join and leave procedures. As used herein, the term "MBMS service" or simply "MBMS" might refer to a multimedia broadcast or multicast that may be available in a cell but that may or may not be received by a UE in that cell. The term "MBMS session" might refer to a particular instance of an MBMS service that is actually being received by a UE.

A UE can have prior knowledge about MBMS services through USD (User Subscriber Data) that previously (and electronically) sent to a subscriber (UE) by e.g., the application layer. The USD provides the MBMS service identity and the corresponding Service Area Identity or Identities (SAI(s)). SAI is territorial, for example New York metro area, assigned by the BM-SC. Cells that provide the MBMS service in that territory belong to the same SAI.

The UE, however, may not know the serving and neighboring cells SAI, therefore it does not know whether a certain MBMS service that the UE is receiving or interested to receive, is available in the serving and/or its neighboring cells. To check the availability of the MBMS service in the serving or neighboring cells, the UE must acquire the MCCH of the serving cell and/or the neighboring cell. This is not efficient, especially if the MBMS is provided at a difference carrier in a Carrier Aggregation (CA) environment.

Therefore in order to enable MBMS service and enabling MBMS service continuity efficiently, it is beneficial if a UE can get some assistance to know the MBMS service that the serving and neighboring cells provide with its corresponding carriers. To assist the UE, an MBMS capable cell can broadcast its SAI (if the serving cell is a member of a SAI) and its neighboring cells' SAI (including small cells' SAI if the neighboring small cells provide MBMS service) with the corresponding frequency for the MBMS service, assigned by the radio access network. This broadcast requires MBMS information exchange over the backhaul, and allows the UE to switch only to a carrier that provides the corresponding MBMS service and to acquire the SIB 13 and the MCCH of that carrier.

Figure 1B:
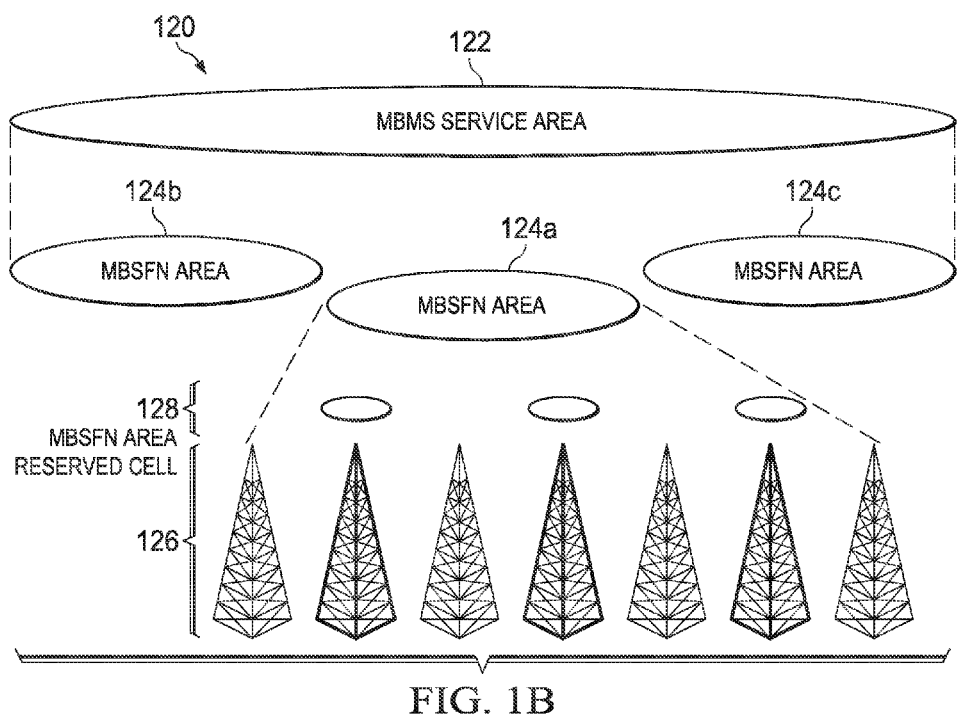
FIG. 1B is a schematic diagram of an example network showing an multimedia Broadcast Multicast Service (MBMS) Service Area.

MBMS and non-MBMS cells indicate for each neighbor frequency the list of MBMS SAIs. If the MBMS SAIs are provided in SI, the UE interested in a MBMS service is only allowed to prioritize other frequencies and indicate interest based on this information. An MBSFN Synchronization Area is an area of the network where all eNBs can be synchronized and perform MBSFN transmissions. MBSFN Synchronization Areas are capable of supporting one or more MBSFN Areas. On a given frequency layer, an eNB can only belong to one MBSFN Synchronization Area. MBSFN Synchronization Areas are independent from the definition of MBMS Service Areas. The definition of MBSFN Transmission is a simulcast transmission technique realized by transmission of identical waveforms at the same time from multiple cells. An MBSFN Transmission from multiple cells within the MBSFN Area is seen as a single transmission by a UE. An MBMS Service Area ID (SAI) identifies the MBMS service area where the MBMS service is available. FIG. 1B is a schematic diagram of an example network 120 showing an multimedia Broadcast Multicast Service (MBMS) Service Area 122. As shown in FIG. 1B, MBMS Service Area 122 can include of one or more MBSFN area 126a-c. A synchronized MBMS transmission is guaranteed only within one MBSFN area, and each cell (e.g., cell 128) that belongs to the same MBSFN area (e.g., MBSFN area 124a) carries the same MBMS service(s). That means the MBMS service continuity occurs when the UE moves to another cell within one MBSFN area. If the UE moves to another cell within one MBMS service area but in a different MBSFN area, the same MBMS service(s) is available but there is no guarantee that the MBMS transmission is in sync (even from the MBMS content level). An MBSFN synchronization area is an area where eNBs are synchronized for MBSFN transmission, and an eNB can only belong to one MBSFN synchronization area on one carrier or frequency layer. An MBSFN synchronization area can support more than one MBSFN areas. It means in a different carrier or frequency layer, an eNB will belongs to a different MBSFN synchronization area, consequently it will be a different MBSFN area. A MBMS service is transmitted in sync within an MBSFN area.

Figure 1C:
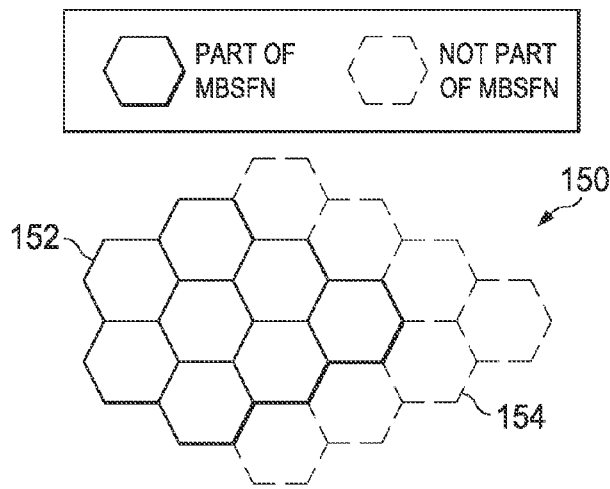
FIG. 1C is a schematic diagram of an example network showing Multicast Broadcast Single Frequency Network (MBSFN) cells and non-MBSFN cells.

FIG. 1C is a schematic diagram of an example network 150 showing Multicast Broadcast Single Frequency Network (MBSFN) cells 152 and non-MBSFN cells 154. The MBSFN can expand MBMS service to a plurality of cells. Such cells can synchronously transmit MBMS traffic using the same radio properties, and when the cells are adjacent to each other, a UE can combine the radio signals from neighboring cells and obtain a better SINR (Signal to Interference plus Noise Ratio). So the lack of an ACK/NACK and other issues mentioned above with regard to the unidirectional transmission mode for MBMS services are somewhat compensated for by the fact that the UE can combine radio signals from adjacent cells and thereby possibly receive fewer error frames. An MBSFN is identified by a field: MBSFN-AreaID in SIB 13. An MBMS service area can include one or more MBSFN area. Because the synchronous transmission is guaranteed to occur only in cells within an MBSFN area, not within MBMS service area, a MBMS service continuity can only occur among cell within MBSFN area. If the target cell belongs to a different MBSFN, the MBMS service between the serving and the target cells may have a different start time and different radio properties, even when both cells belong to the same MBMS service area. Tolerating the different start time and adjusting the radio properties will allow (for what this disclosure refers to as) "imperfect" MBMS service continuity in a target cell within the same SAI but a different MBSFN.

As mentioned above, LTE does not have joining and leaving procedures similar to those in UMTS. This means an eNB may not have information about the MBMS services that a UE is actively receiving or is interested in receiving. When a UE is to be handed over from a serving cell to a target cell, the eNB determines which cell will be the target cell based on signal measurement reports from the UE. However, since the eNB has no information about the MBMS services that the UE is receiving or is interested in receiving, the eNB cannot adjust the handover decision to ensure that the UE will be handed over to a target cell where the MBMS services will continue to be available. That is, the eNB hands the UE over to the cell with the best signal quality, without regard to the MBMS services available in that cell. If an MBMS service that the UE is receiving in the serving cell is available in the target cell, the MBMS service might be continued in the target cell. However, if an MBMS service that the UE is receiving in the serving cell is not available in the target cell, the MBMS service might be dropped when the UE moves to the target cell.

Figure 2:
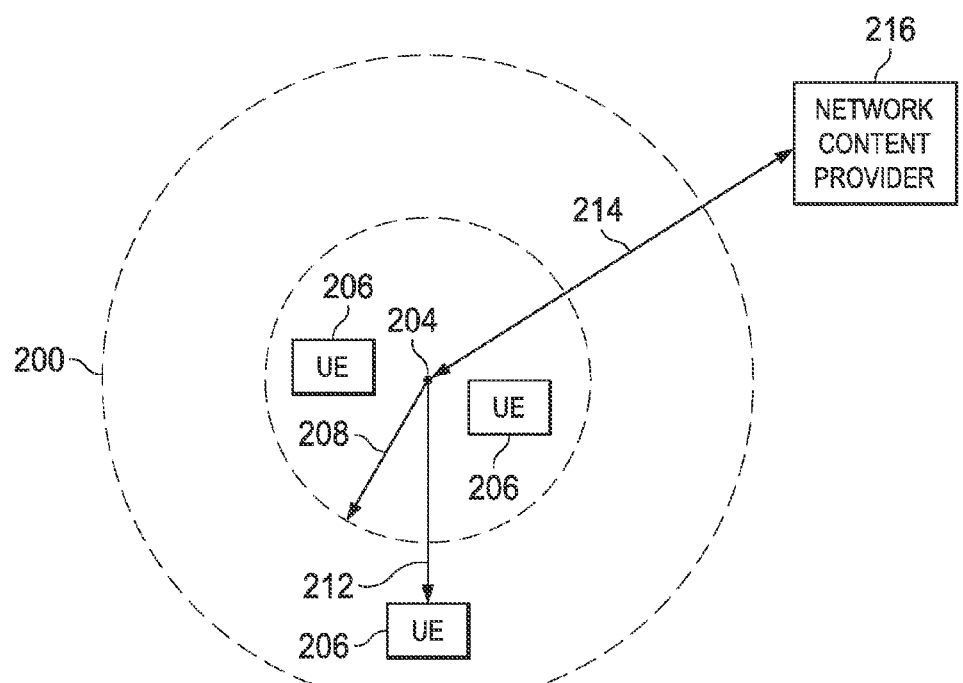
FIG. 2 is a schematic representation of an example heterogeneous wireless communication network.

FIG. 2 illustrates an exemplary cell 200 within the cellular network 100. The cell 200 includes an eNB 204 and a plurality of UE 206. The eNB 204 may receive a MBMS or other services through communication with a network content provider 216 over a backhaul network connection 214. Upon receiving the MBMS or other services, the eNB 204 may determine whether any of the UE 206 are interested in the MBMS or other services. While only three UE 206 are depicted within the cell 200, persons of ordinary skill in the art will recognize that there may be more or fewer UE 206 within the cell. Further, while the eNB 204 is show to be in communication with one network content provider 216, persons of ordinary skill in the art will recognize that the eNB 204 may be in communication with a plurality of content providers.

The UE 206 may each operate in a connected state or an idle state with the eNB 204. The UE 206 in the connected state are in active communication with the eNB 204, whereas the UE 206 in the idle state may be in range of the eNB 204, but not in active communication. For the UE 206 in the connected state, the eNB 204 may easily determine how many UE 206 are currently using the MBMS or other services.

Figure 3:
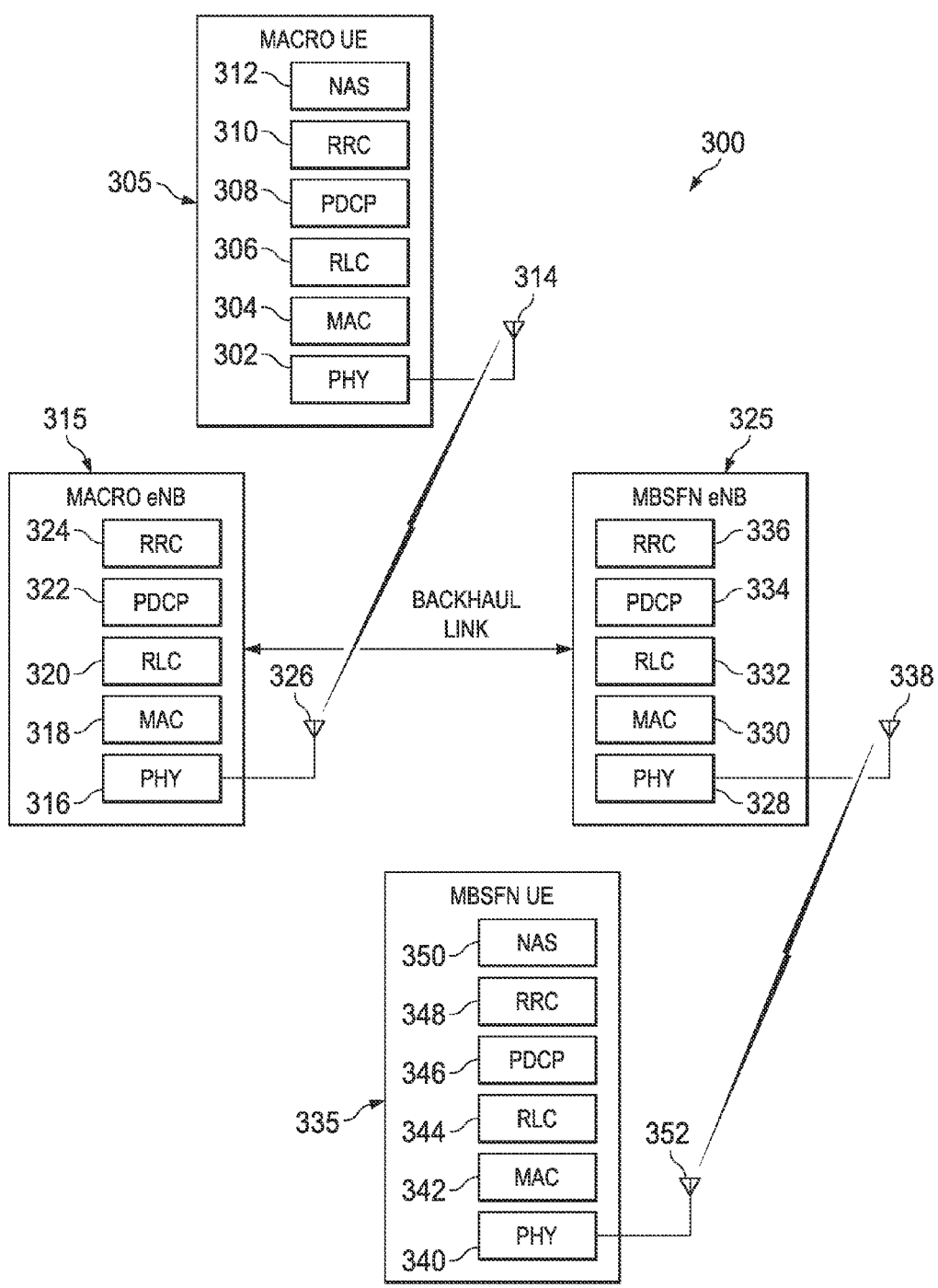
FIG. 3 is a schematic block diagram illustrating various layers of access nodes and user equipment in a wireless communication network.

FIG. 3 is a schematic block diagram 300 illustrating various layers of access nodes and user equipment in a wireless communication network. The illustrated system 300 includes a macro eNB 315, a MBSFN eNB 325, a macro UE 305, and a MBSFN UE 335. Here macro UE 305 and MBSFN UE 335 are UEs which are either actively communicating or camping on macro eNB 315 and MBSFN eNB 325 respectively. The macro eNB 315 and the MBSFN eNB 325 can be collectively referred to as a "network," "network components," "network elements," "access nodes," or "access devices." FIG. 3 shows only these four devices (alternatively, referred to as "apparatuses" or "entities") for illustrative purposes, and the system 300 can further include one or more of these devices without departing from the scope of this disclosure. The macro eNB 315 can communicate wirelessly with the macro UE 305. The MBSFN eNB 325 can communicate wirelessly with the MBSFN UE 335. The macro eNB 315 can communicate with the MBSFN eNB 325 via a backhaul link, for example, an X2 backhaul link, a wireless connection, or a combination thereof. In some implementations, the macro eNB 315 and MBSFN eNB 325 may exchange their transmission power levels via the backhaul link.

Each of the devices 305, 315, 325 and 335 includes a protocol stack for communications with other devices via wireless or wired connection. The macro eNB 315 can include a physical (PHY) layer 316, a medium access control (MAC) layer 318, a radio link control (RLC) layer 320, a packet data convergence protocol (PDCP) layer 322, and a radio resource control (RRC) layer 324. In the case of user plane communications for data traffic, RRC layer is not involved. The macro eNB 315 can also include one or more transmit and receive antennas 326 coupled to the PHY layer 316. In the illustrated implementation, a "PHY layer" can also be referred to as "layer 1." A MAC layer can also be referred to as "layer 2." The other layers (RLC layer, PDCP layer, RRC layer and above) can be collectively referred to as a "higher layer(s)."

Similarly, the MBSFN eNB 325 includes a PHY layer 328, a MAC layer 330, a RLC layer 332, a PDCP layer 334, and an RRC layer 336. The MBSFN eNB 325 can also include one or more antennas 338 coupled to the PHY layer 328.

The macro UE 305 can include a PHY layer 302, a MAC layer 304, a RLC layer 306, a PDCP layer 308, an RRC layer 310, and a non-access stratum (NAS) layer 312. The macro UE 305 can also include one or more transmit and receive antennas 314 coupled to the PHY layer 302. Similarly, the MBSFN UE 335 can include a PHY layer 340, a MAC layer 342, a RLC layer 344, a PDCP layer 346, an RRC layer 348, and a NAS layer 350. The MBSFN UE 335 can also include one or more transmit and receive antennas 352 coupled to the PHY layer 340.

Communications between the devices, such as between the macro eNB 315 and the macro UE 305, generally occur within the same protocol layer between the two devices. Thus, for example, communications from the RRC layer 324 at the macro eNB 315 travel through the PDCP layer 322, the RLC layer 320, the MAC layer 318, and the PHY layer 316, and are sent over the PHY layer 316 and the antenna 326 to the macro UE 305. When received at the antenna 314 of the macro UE 305, the communications travel through the PHY layer 302, the MAC layer 304, the RLC layer 306, the PDCP layer 308 to the RRC layer 310 of the macro UE 305. Such communications are generally done utilizing a communications sub-system and a processor, as described in more detail below.

In the implementations described in this disclosure, various steps and actions of the macro eNB, macro UE, MBSFN eNB, and MBSFN UE can be performed by one or more of the layers described above in connection with FIG. 3. For example, mobility procedure for the macro UE 305 can be performed by one or more of the layers 302-312 of the macro UE 305. Mobility procedure by the MBSFN UE 335 can be performed by one or more of the layers 340-350 of the MBSFN UE 335. Mobility state estimation may be performed by the PHY layer and MAC layer of the macro UE 305 and MBSFN UE 335. For another example, configuration of UE mobility parameters may be initiated by the RRC layer 324 of the macro eNB 315 and the RRC layer 336 of the MBSFN eNB 325.

Figure 4:
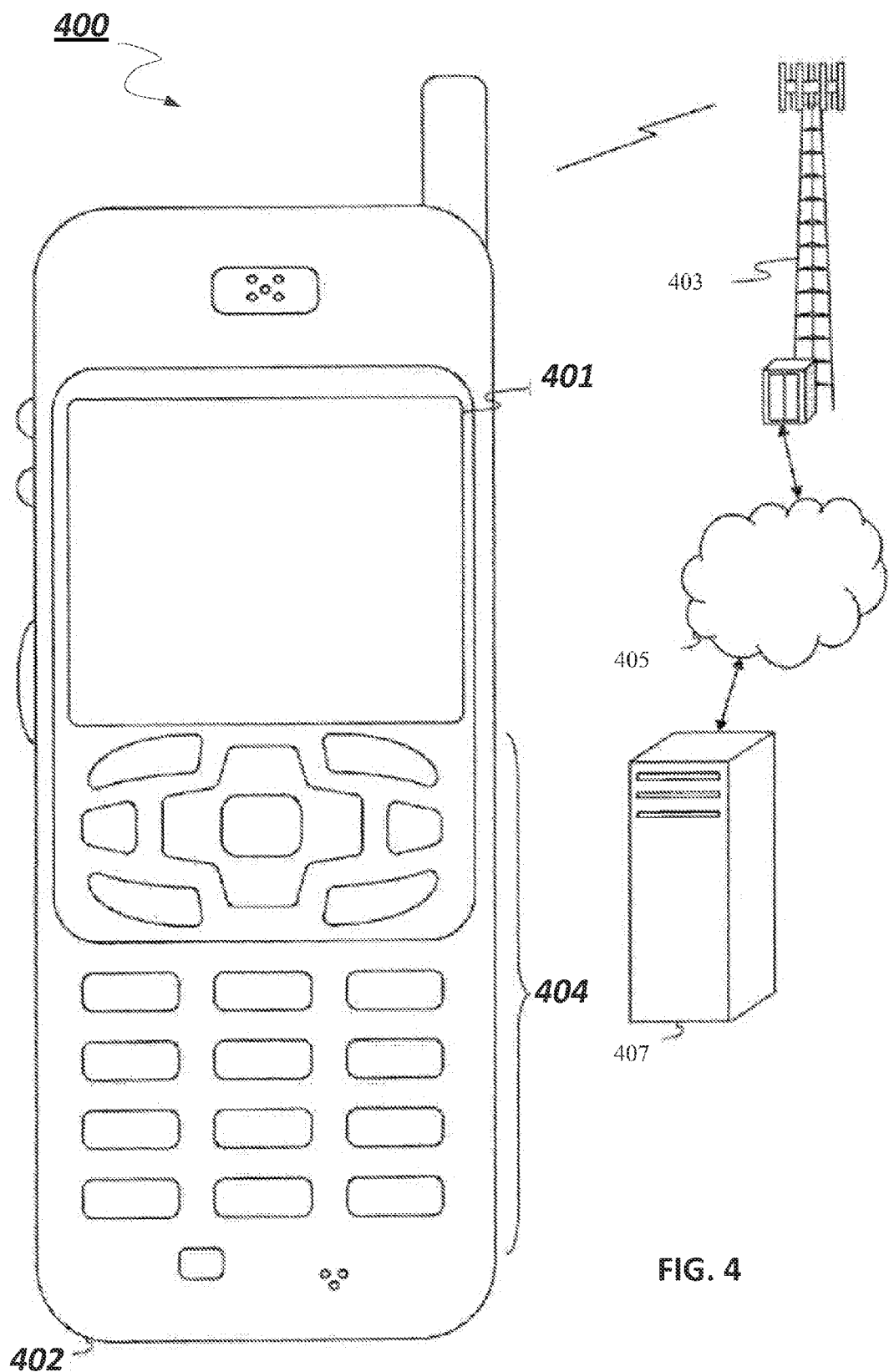
FIG. 4 is a schematic block diagram of a wireless communications system including an example of a mobile device.

FIG. 4 is a schematic block diagram of a wireless communications system 400 including an example of a mobile device 402. The mobile device 402 is operable for implementing aspects of the disclosure, but the disclosure should not be limited to these implementations. The illustrated as a mobile phone, the mobile device 402 may take various forms including a wireless handset, a pager, a personal digital assistant (PDA), a portable computer, a tablet computer, or a laptop computer. Many suitable mobile devices combine some or all of these functions. In some embodiments of the disclosure, the mobile device 402 is not a general purpose computing device like a portable, laptop or tablet computer, but rather is a special-purpose communications device such as a mobile phone, wireless handset, pager, or PDA. In another embodiment, the mobile device 402 may be a portable, laptop or other computing device.

The mobile device 402 includes a display 401. The mobile device 402 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The mobile device 402 may present options for the user to select, controls for the user to actuate, and/or cursors or other indicators for the user to direct. The mobile device 402 may further accept data entry from the user, including numbers to dial or various parameter values for configuring the operation of the mobile device 402. The mobile device 402 may further execute one or more software or firmware applications in response to user commands. These applications may configure the mobile device 402 to perform various customized functions in response to user interaction.

Among the various applications executable by the mobile device 402 are a web browser, which enables the display 400 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the mobile device 402 has access to information on various servers, such as a server 410. The server 410 may provide content that may be shown on the display 400.

Figure 5:
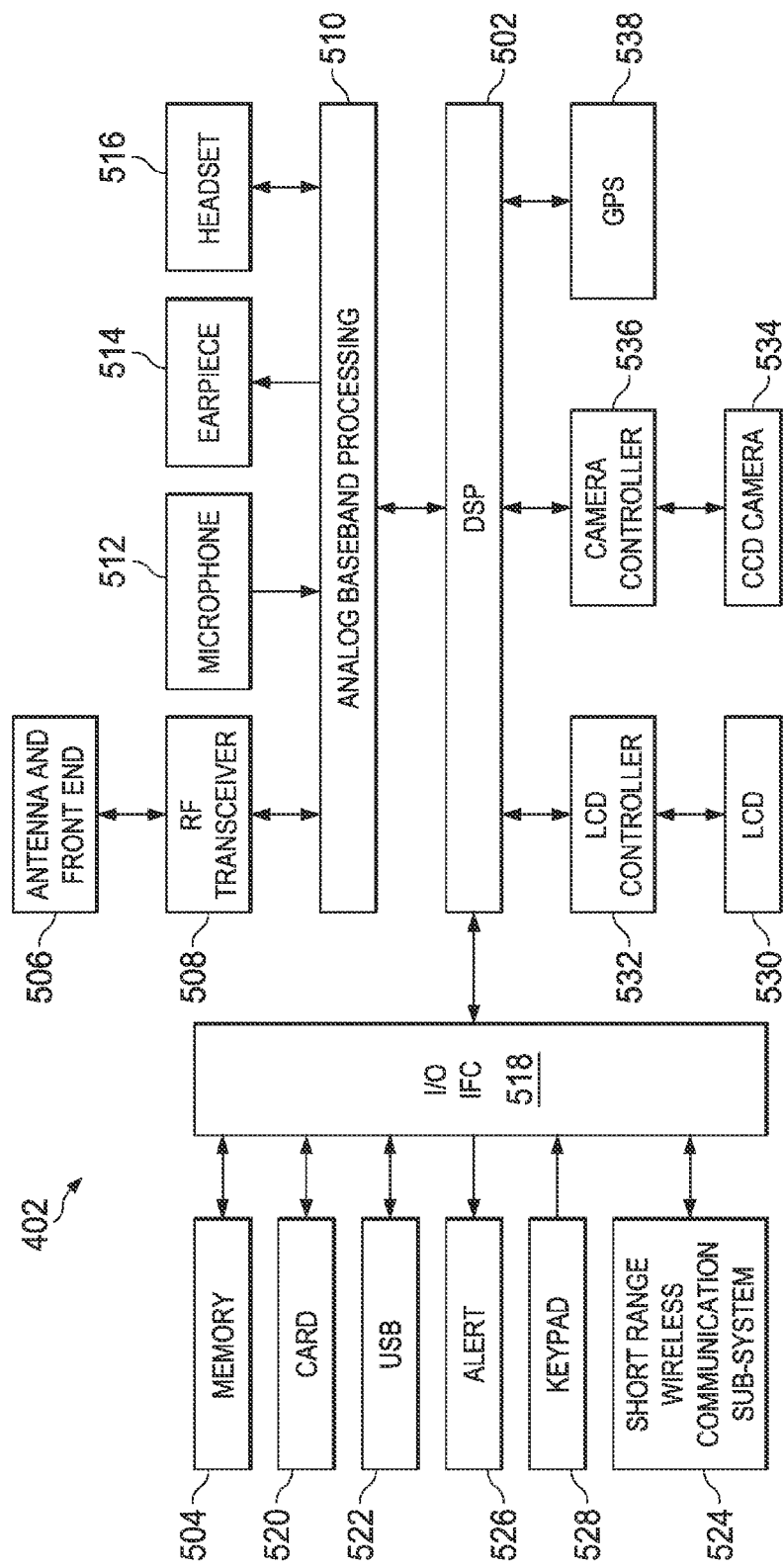
FIG. 5 is a schematic block diagram of the mobile device.

FIG. 5 is a schematic block diagram of the mobile device 402. The mobile device 402 includes a digital signal processor (DSP) 502 and a memory 504. As shown, the mobile device 402 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication subsystem 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538.

The DSP 502 or some other form of controller or central processing unit operates to control the various components of the mobile device 402 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 402 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the mobile device 402 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the mobile device 402 and may also enable the mobile device 402 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the mobile device 402 to communicate wirelessly with other nearby mobile devices and/or wireless base stations.

The input/output interface 518 may further connect the DSP 502 to the alert 526 that, when triggered, causes the mobile device 402 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the mobile device 402. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the mobile device 402 to take digital pictures. The DSP 502 communicates with the CCD camera 534 via the camera controller 536. The GPS sensor 538 is coupled to the DSP 502 to decode global positioning system signals, thereby enabling the mobile device 402 to determine its position. Various other peripherals may also be included to provide additional functions, e.g., radio and television reception.

As mentioned earlier, LTE does not have joining/leaving procedures similar to those in UMTS. This means the network may not have context information about the MBMS services (identified by TMGIs) in which the UE is interested, nor information about MBMS services that the UE is actively receiving. When the UE is in RRC Connected mode, the eNB makes handover decisions based on the Measurement Reports from the UE, but without information about the MBMS services that the UE is interested in or actively receiving, the eNB cannot adjust the handover decision to ensure that the UE will be handed over to a target cell where the MBMS service(s) will continue to be available.

Join and leave procedures can be introduced in LTE, similar to UMTS. In this implementation, however, a new MBMS indication can be added as a separate message or in the measurement report (for UE in RRC Connected mode) to give indication whether the UE is receiving/interested to receive or not receiving/not interested to receive MBMS session(s) instead of introducing join and leave procedure for LTE.

Figure 6A:
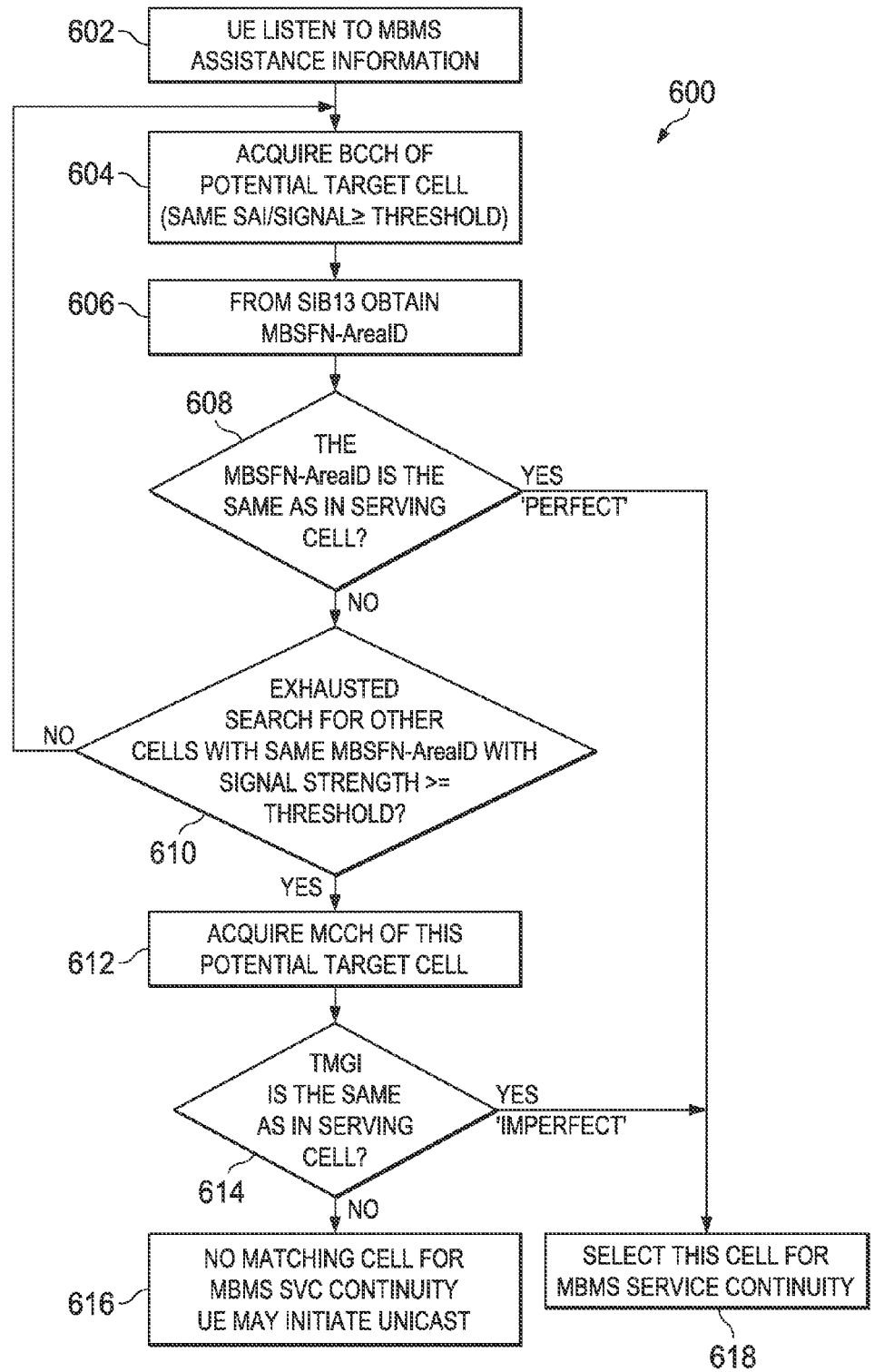
FIG. 6A is a process flowchart showing an example process to select the target cell to provide MBMS continuity for an RRC Connected UE.

FIG. 6A is a process flowchart 600 showing an example process to select the target cell to provide MBMS continuity for an RRC Idle UE. After listening to the MBMS Assistance Info (602), the UE acquires the broadcast channel of cell that has a matching SAI and with signal strength above a threshold to correctly receive MBMS transmission (604). The UE obtains the MBSFN-AreaID from SIB 13 of that cell to find a matching MBSFN-AreaID for a "perfect" MBMS service continuity (606). It can be determined whether the MBSFN-AreaID obtained is the same as that of the serving cell (608). If a matching MBSFN-AreaID is found for a target cell, the target cell can be selected for MBMS continuity (618). If a matching MBSFN-AreaID is not found, the UE tries to find other cell that has a matching MBSFN-AreaID and with signal strength above a threshold to correctly receive MBMS transmission (610). If other cells having the same MBSFN-AreaID and a signal strength greater than a threshold value are found, then the BCCH of one or more cells is identified and returns (604), and the process continues. If no cell with matching MBSFN-AreaID is found, the UE can acquire the MCCH to finds a cell with a matching TMGI for "imperfect"

MBMS service continuation (612). It can be determined whether the TMGI of the target cell is the same as the serving cell (614). If a cell with a matching TMGI is also found, the MBMS service cannot continue through p-t-m transmission (616). If a target cell does have a matching TMGI as a serving cell, then that target cell can be selected for MBMS continuity (618).

In RRC Connected mode, the TMGI(s) or MBSFN-AreaID that the UE is currently receiving or interested to receive can be added to the measurement report, for both for UMTS and LTE. Each TMGI can indicate a multicast bearer that carries one MBMS session that correspond to the MBMS service the UE is receiving or interested to continuously receive. The presence of TMGI(s) indicates whether the UE is receiving or interested to receive the corresponding MBMS session(s). This alternative assumes that the MME has an up to date knowledge of each cell's MBSFN(s)/TMGI(s) under its domain, e.g., from BM-SC. The TMGI, however, is valid within a PLMN that may span across multiple MBSFN areas, or a TMGI may not be globally unique within one MBSFN area. Therefore TMGI and/or MBSFN-AreaID can be used for an MBMS service within one MBSFN area. For "perfect" MBMS service continuity, MBSFN-AreaID is enough because a cell that belongs to the same MBSFN area provides all MBMS service(s) in that MBSFN area, and, in some circumstances, at the same time. But if an "imperfect" MBMS service continuity is followed, the TMGI can be included so that the search for an appropriate target cell goes beyond an MBSFN area boundary.

FIG. 6B is a process flowchart 650 showing an example process to handover the target cell to provide MBMS continuity for an RRC Connected UE. The UE includes the TMGI and/or MBSFN-AreaID in the measurement report (652). The service cell can determine whether it has the information about the TMGI and/or MBSFN-AreaID of one or more target cells (654). If the serving cell does not have information about the TMGI and/or MBSFN-AreaID of the measured cell, the information can be acquired from the MME (656), and the serving cell can match potential target cells (658). If the MME returned qualified cell(s) to eNB or the stored qualified cell(s) in eNB matches the MBSFN-AreaID in the measurement report and the measured cell(s) that is (are) greater than or equal to a certain threshold (to support MBMS transmission), the serving cell select the best qualified cell as the target cell based on the signal strength (658). It can be determined whether the MBSFN-AreaID for the target cell is the same as that of the service cell (660). In the example related to Table 1 below, the serving cell selects the target cell between cell2 and cell4, for the UE to have a "perfect" MBMS service continuity. Because the target cell is part of the MBSFN area, the MBMS session(s) is multicast in the target cell with the same radio properties as in the serving cell, and the cell is selected for MBMS continuity (670). If the MBSFN-AreaID of the target cell is different from the service cell, it can be determined whether all cells with the same MBSFN-AreaID and a high enough signal strength have been considered (662). If not, then the serving cell can continue trying to identify target cells (658). If none of the target cells is of the same MBSFN area as the serving cell, the MME may return target cell that provides the same MBMS service based on the TMGI(s) as qualified cell with additional information such as the start time, frequency or carrier, radio properties, etc. (664). It can be determined whether the target cell has the same TMGI as the serving cell (666). If the target cell has the same TMGI as the serving cell, this cell can be selected for MBMS continuity (670).

In the RRC Idle mode, a UE that is interested to (continuously) receive an MBMS service selects a target cell based on the MBMS assistance information from the serving cell broadcast channel. The MBMS assistance information guides an idle mode UE to switch to the target cell MBMS frequency and to acquire the BCCH (and MCCH) of a target cell. The SAI, however, only guarantees there will be the same MBMS service but it does not guarantee that the target cell belongs to the same MBSFN area for synchronous MBMS service transmission. For a "perfect" MBMS service continuity, the UE must select a target cell with the same MBSFN-AreaID obtained from the target cell BCCH's SIB 13. For an "imperfect" MBMS service continuity, the UE selects a target cell with the same TMGI obtained from MCCH's PMCH-InfoList. The MBMS service continuity requires acquisition of BCCH in target cell and MCCH if MBSFN-AreaID does not match and "imperfect" MBMS service continuity is permitted. In "perfect" MBMS service continuity, the sync is guaranteed to occur only within an MBSFN area, so an MBSFN-AreaID can be used as an indication of the MBMS service to be continued. For "imperfect" MBMS service continuity, no sync is required and it can be achieved even when the UE moves to a target cell belongs to a different MBSFN area. TMGI can be an indication of the 'imperfect MBMS service continuity.

TMGI is part of MCH (Multicast Channel) configuration within an MBSFN area and a TMGI maps to an MBMS service. The $3^{rd}$ to the $5^{th}$ octets of the TMGI can be used as the MBMS service ID. There could be more than one MBMS services in one MCH configuration and each MBMS service corresponds to a unique TMGI. There could be more than one MCH in one MBSFN area. The UE can obtain this information from MCCH in the PMCH-InfoList IE. The TMGI, however is valid within a PLMN that may cross multiple MBSFN Areas.

In short, it is possible that the two different MBSFN areas are transmitting the same MBMS service in sync or out of sync, with the same TMGI, using different radio properties.

The MBMS service continuity can be realized through handover for UE in RRC connected mode and through cell (re)selection for UE in RRC idle mode, to a target cell in the same MBSFN area or to target cell with the same TMGI. If the target cell is in a different MBSFN area, the difference between the MBMS service parameters such as different start time, different frequency, different radio properties, etc. can be acknowledged.

When the eNB configures measurement such that the neighbor cell signal strength is beyond a certain threshold, it triggers the RRC connected UE to send measurement report to the serving eNB. In case that UE is receiving or interested to receive MBMS service(s), the corresponding TMGI(s) or MBSFN-AreaID (s) are sent through a separate message or added in the measurement report. The UE sends MBSFN-AreaID(s) to obtain a "perfect" MBMS service continuity and sends TMGI(s) to obtain "imperfect" service continuity. Alternatively the UE can send both MBSFN-AreaID(s) and TMGI(s) for "perfect" MBMS service continuity and give the serving eNB the flexibility to offer "imperfect" MBMS service continuity by returning TMGI(s), in case none of the neighboring cell belongs to the same MBSFN area.

The UE may have prior knowledge of the TMGI(s) and/or MBSFN-AreaID(s) of the neighboring cell(s) from system information update in the serving cell. The UE will send measurement report containing measured cell(s) that have the same TMGI and/or MBSFN-AreaID only and have signal strength beyond a certain threshold.

This serving eNB knows whether the reporting UE has unicast bearer(s) beside the MBMS service(s) indicated by the TMGI(s)/MBSFN-AreaID (s). The signal strength threshold to handover MBMS p-t-m transmission to a neighboring cell that is part of MBSFN could be different from the unicast threshold. The threshold of the neighboring cell for the MBMS p-t-m transmission, which allow "soft combining" of signal from multiple cells within the same MBSFN, could be set higher than the unicast transmission. If the UE has a mix of unicast and MBMS services, or the neighbor cell is not part of the MBSFN, the regular threshold for the unicast transmission is used. The prioritization of the unicast vs. MBMS service(s) in selecting a target eNB can be indicated by the UE to the network or is an implementation. If the unicast, for example, is an emergency call, the serving eNB will ignore the TMGI(s)/MBSFN-AreaID and select the target eNB based on the signal strength only. On the other hand if the MBMS service contains ESA, the serving eNB will select a target eNB that provide the MBMS service continuation, and the selected target cell may not necessarily have the best SINR.

The UE may send a new MBMS priority IE in a separate message or in the measurement report to indicate the MBMS service(s) priority. The target cell selection may, be influenced by the priority to provide the MBMS service continuity through p-t-m transmission, e.g., the selected target cell may not be the cell with the best SINR, if the cell with the best SINR does not belong to the MBSFN-AreaID (s)/TMGI(s). If the MBMS priority IE does not indicate that the MBMS service(s) should be prioritized, the target is selected based on the best SINR and the MBMS service(s) may be continued through p-t-p transmission.

In certain implementations, the eNB may compare the measured cell(s) that is (are) beyond the valid threshold (to support MBMS service or to support unicast transmission) with the stored cell(s) with its corresponding TMGI(s)/MBSFN-AreaID (s). If none of the measured cells matches the stored cell(s), the eNB will send M2AP/M3AP MBMS Query message to MME including the TMGI(s) and MBSFN Area ID(s). The MME can then responses with a list of cell(s) in the proximity of the inquiring eNB that has the same MBSFN-AreaID (s) and/or TMGI(s) with the query that provided the MBMS service(s) that the UE is receiving or interested to receive.

Upon receiving the MBMS query, the MME looks up to a table that contains the cell(s) in the proximity of the inquiring eNB that are part of the MBSFN-AreaID (s)/TMGI(s) in the query. Table 1 is an example lookup table as described above.

TABLE 1

Lookup Table for Cells in Proximity to eNB.

| UE's MBSFN-AreaID/TMGI | cell1 | cell2 | cell3 | cell4 |
|---|---|---|---|---|
| MBSFN-AreaID1/TMGI1 | MBSFN1 | MBSFN1 |  | MBSFN1 |
|  | MBSFN2 | MBSFN2 | MBSFN2 |  |
| MBSFN-AreaID3/TMGI3 |  | MBSFN3 |  | MBSFN3 |
|  |  | MBSFN4 | MBSFN4 | MBSFN4 |

The MME can respond with a M2AP/M3AP MBMS Query Ack message containing qualified cell(s), i.e., cell(s) that is part of the TMGI(s)/MBSFN-AreaID (s) in the query. In the example above, if the query contains MBSFN-AreaID1/TMGI1 and MBSFN-AreaID3/TMGI3 the table in MME indicates that cell1, cell2 and cell4 at the proximity of the inquiring eNB are part of MBSFN-AreaID1/TMGI1 and cell2 and cell4 at the proximity of the inquiring eNB are part of MBSFN-AreaID3/TMGI3 (note: in current specifications, a cell is limited to have only one MBSFN and an MBSFN may carry one or more MBMS session(s) through one or more TMGI(s)). In this case MME will return cell2 and cell4 as qualified cells in MBMS Query Ack message since both cells are members of the MBSFN-AreaID (s)/TMGI(s) in the query or the MME may return cell1, cell2 and cell4 that belongs to MBSFN-AreaID1/TMGI1 and cell2 and cell4 that belongs to MBSFN-AreaID3/TMGI3.

The eNB can select a cell with strongest signal and has the same MBSFN, as the target cell. In case of multiple MBSFN-AreaID(s)/TMGI(s) that the UE is engaging, the eNB may select a cell with the strongest signal and has same multiple MBSFN-AreaID(s)/TMGI(s), as the target cell. This scheme allows "perfect" MBMS service continuity.

If none of the returned cell belongs to the same MBSFN area, the eNB may proposed UE to handover to a cell with strongest signal and have the same TMGI or TMGIs (in case the UE is engaging to multiple MBMS service). The eNB may include the starting time, the frequency or carrier, the radio properties, etc., for this "imperfect" MBMS service continuity. The start time allows the UE to decide whether to continue the MBMS service in target cell or not due to the starting time gap between the serving cell and the candidate cell.

If MME does not return any cell, there is no neighboring cell that provides the same MBMS service or the same TMGI. The eNB will let the UE knows and it may trigger the UE to initiate a unicast session to deliver the MBMS service via unicast.

There is a possibility that none of the qualified cell(s) returned in the MBMS Query Ack matches the measured cell(s). In this case, the MBMS service continuity through p-t-m transmission ceased.

The RRC idle UE does not send a new message or a measurement report (with the TMGI(s)/MBSFN-AreaID (s) corresponding to the MBMS service(s) that the UE is receiving or interested to receive). The RRC idle UE will autonomously select a target based on the serving cell's broadcast MBMS assistance information. The cell that has SAI that matches the SAI of the MBMS service that the UE is receiving or interested to receive, with the best signal strength, is selected as the potential target cell. The potential target cell that provides the same MBMS service, however, is not necessarily belongs to the same MBSFN area that guarantees a synchronized MBMS service. Before the UE autonomously select a target cell, the UE obtains the BCCH and check the MBSFN-AreaID from the SIB 13. If the MBSFN-AreaID matches the serving cell MBSFN-AreaID, the UE select that cell as the target cell for a "perfect" MBMS service continuation, otherwise the UE obtain the MCCH of this potential target cell to know the TMGI. If the TMGI of this cell matches the TMGI in the serving cell, the UE can select this cell as the target cell for "imperfect" MBMS service continuation. Alternatively, the UE may select a cell with the second best signal strength as the potential target cell, obtain the BCCH of this cell and check the MBSFN-AreaID from SIB 13, follow the same procedure as explained above until a cell with matching MBSFN-AreaID is found with signal strength acceptable to receive MBMS transmission.

In case there is no matching SAI, MBMS service continuity cannot occur, or the UE change to RRC connected mode and initiate a unicast session to receive the MBMS service via unicast transmission For a handover situation, the serving cell directs the handover by sending RRC Connection Reconfiguration to the UE with the TMGI(s) and the start time of the selected target cell, so the UE knows that the target cell is member of all or some of the TMGI(s) that the UE is receiving or interested to receive the MBMS service(s) for "imperfect" MBMS service continuation. If the serving cell cannot obtain a measured cell with a matching TMGI, the MBMS service cannot continue through p-t-m transmission. In case UE also has unicast session, the unicast session is also handed over to the same target cell and the unicast handover procedures are not impacted. The UE may send MBMS priority IE in the measurement report or in other message to indicate whether the MBMS service(s) is prioritized. The target cell selection may be influenced by the priority to provide the MBMS service continuity through p-t-m transmission, e.g., the selected target cell may not be the cell with the best SINR, if the cell with the best SINR does not belong to the MBSFN(s)/TMGI(s). If the MBMS priority IE does not indicate that the MBMS service(s) should be prioritized, the target is selected based on the best SINR and the MBMS service(s) may be continued through p-t-p transmission.

The serving cell will update the stored qualified cell(s) with the returned qualified cell(s) and then forward to the target cell, e.g., through X2AP or S1AP so the target cell gets the up to date MBMS configuration information related to the neighboring cells. In the subsequent handover, if the measured cell(s) that have sufficient quality to support the MBMS multicast service matches one of the up to date stored qualified cell(s), the serving cell need not send MBMS Query to the MME but it can select the next target cell among the up to date stored qualified cell(s) information. The stored qualified cell(s) stores the cell and the corresponding MBSFN/TMGI(s) that the cell belongs to. Therefore the forwarding of the query result to the target cell help reduce further query from the target cell to the MME in case of handover from the target cell to its neighboring cell, using the message sequence in the existing procedures.

In case there is discrepancy between the stored and the returned qualified cell from MME, the newer qualified cell information wins and the stored qualified cell is updated.

The storing duration of the qualified cell(s) with the corresponding MBSFN(s)/TMGI(s) in an eNB can be timer based or terminated when that eNB deactivates its membership to the MBSFN/TMGI. After certain period not receiving measurement report containing a particular MBSFN/TMGI, the eNB may remove the list of cell(s) that belong to the MBSFN If the MME returned qualified cell(s) and the stored qualified cell(s) in eNB do not match the measured cell(s) that is (are) beyond a certain threshold (to support MBMS service), the serving cell will add p-t-p (point to point) transmission for the reporting UE, simultaneously transmitting the same MBMS session with p-t-m transmission.

The serving cell can add p-t-p transmission with more robust radio properties by sending RRC Connection Reconfiguration to the UE with a non-Handover (nonHO) indication. The procedure may trigger higher layer procedures where the UE may activate a Dedicated EPS Bearer for the p-t-p transmission, assuming the UE has established the Default EPS bearer during RRC Connection procedure. The p-t-p transmission allows robust HARQ scheme even when the RLC mode is UM, similar to the p-t-m transmission.

The simultaneous p-t-m and p-t-p transmission of the same MBMS session requires the cell to put the same RLC PDU to different schedule (in MCH and in DL-SCH) with different radio property (e.g., p-t-p transmission has less aggressive MCS). The simultaneous p-t-p and p-t-m reception with the same MBMS content allows the UE to combine the p-t-m and p-t-p communications to improve the p-t-m communication received by the UE. In addition, the p-t-p transmission gives time to prepare the p-t-p handover to the adjacent cell that is not part of the MBSFN so the UE can continue the MBMS session in the target cell through p-t-p transmission.

The S1AP Handover Required and Handover Request messages or X2AP Handover Request message should include MBMS indication with the IP Multicast address of the MBMS-GW so that the target cell can join the MBMS multicast from the MBMS-GW.

In certain implementations, the serving cell may directly handover the MBMS session from p-t-m transmission in serving cell to p-t-p transmission in target cell. Similarly, the S1AP Handover Required and Handover Request messages or X2AP Handover Request message should include MBMS indication with the IP Multicast address of the MBMS-GW so that the target cell can join the MBMS multicast from the MBMS-GW.

The serving cell can direct or coordinate the handover by sending RRC Connection Reconfiguration to the UE with non-MBMS indication (e.g., MBMS indication set to '0') and the target cell, so the UE will not retain the MBMS properties when it is joining the target cell but establish the p-t-p or unicast radio properties. In case the UE also has a unicast session, the other unicast handover procedures are not impacted.

Figure 7:
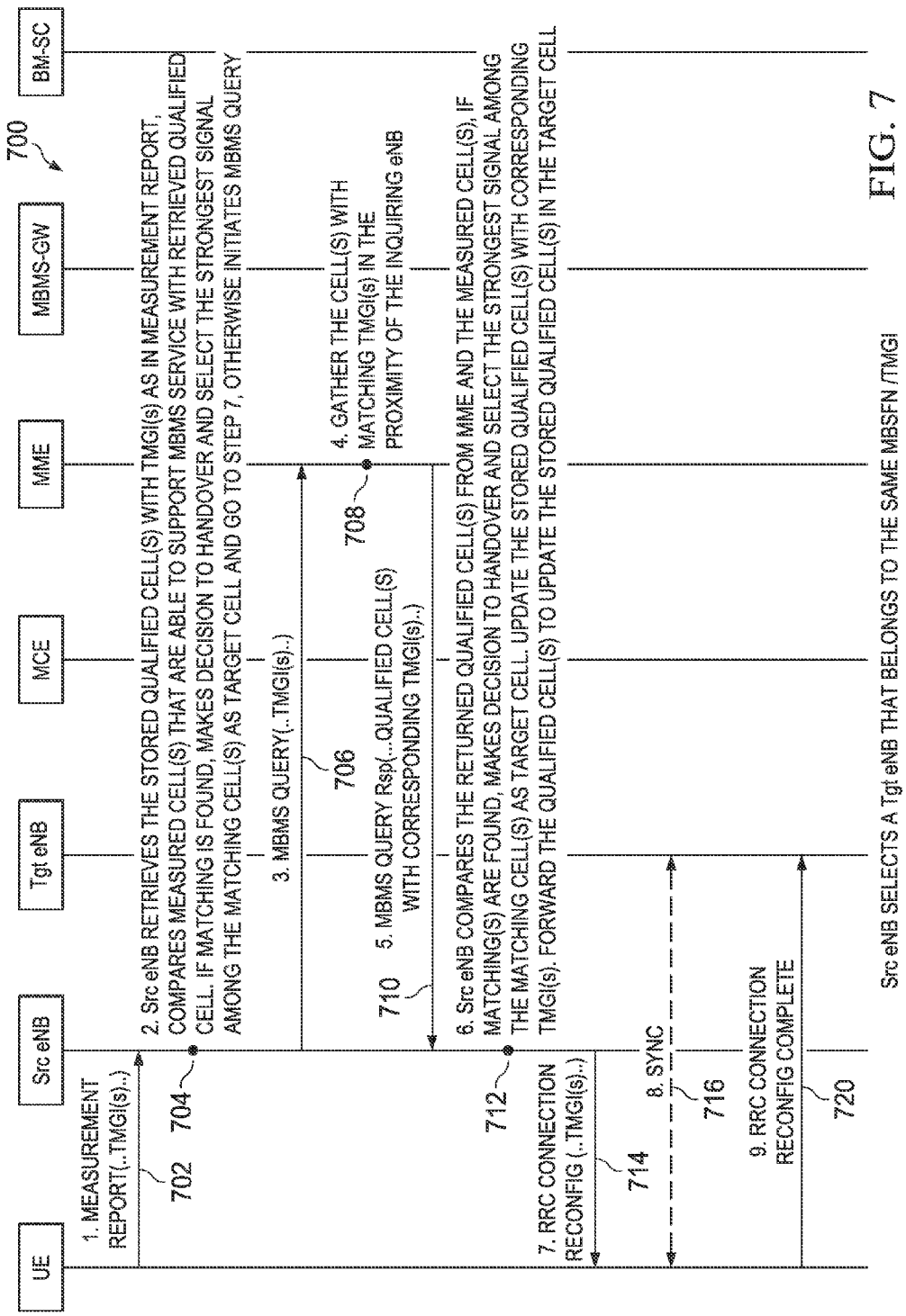
FIG. 7 is a swim-lane diagram showing example process steps for an implementation of maintaining MBMS continuity.

FIG. 7 is a swim-lane diagram 700 showing process steps for an example implementation of maintaining MBMS continuity. In FIG. 7, the MME returns qualified cell(s) or stored qualified cell(s) that match the measured cell(s). If the signal strength of the neighboring cell(s) reaches a certain threshold, UE sends a measurement report to the source eNB or serving cell (702). The source eNB can retrieve stored qualified cell(s) with the same MBSFN-AreaIDs and/or TMGIs as indicated in the measurement report from the UE (704). If the UE is receiving or interested to receive MBMS session(s), the included MBSFN-AreaID(s)/TMGI(s) indicate the MBMS service(s) that the UE is receiving or interested to receive; otherwise the MBSFN-AreaID or TMGI is set to "0." The source eNB retrieves the stored cells that are belong to the same MBSFN (e.g., based on MBSFN-AreaID) or transmitting the same TMGI(s) as in the measurement report (qualified cell(s)). If there is matching between the qualified cell(s) and the measured cell, the source eNB can select a cell with the strongest signal among the matching cells as the target cell (704) and the process can proceed to step 714. Otherwise, initiates MBMS query in step 706.

The source eNB sends an M2AP/M3AP MBMS Query to the MME (via MCE), with MBSFN-AreaID(s)/TMGI(s) similar to the MBSFN-AreaID(s)/TMGI(s) in the measurement report (706). The MME retrieves the cell(s) in the proximity of the inquiring eNB that belong to the same MBSFN or eNB that are transmitting the same TMGI(s) (the qualified cell(s)) (708). In case there is no matching MBSFN for "perfect" MBMS service continuity, the UE can consider matching MBMS service from different MBSFN area indicated by the same TMGI (708) for "imperfect" MBMS service continuity. The MME returns the qualified cell(s) with the corresponding MBSFN-AreaID(s)/TMGI(s) in MBMS Query Response message to the source eNB (710). The information of the candidate cell with the same MBMS service includes MBSFN-AreaID or the TMGI with the frequency or carrier and the start time (710). The source eNB matches the qualified cell(s) from the MME to the measured cell (712). If matching cell(s) is found, select a cell with the strongest signal among the matching cells as the target cell. Update the stored qualified cell(s) with the qualified cell(s) from the MME when it is applicable; also forward the qualified cell(s) from MME to the target cell(s) via S1AP or X2AP to update the stored qualified cell(s) in the target cell.

The eNB sends RRC Connection Reconfiguration to the UE to start the handover procedure including the MBSFN-AreaID(s) or the TMGI(s) and the start time (714). This MBSFN-AreaID(s) or TMGI(s) indicates which MBMS service(s) that the UE can continue to receive through p-t-m transmission in the target cell, since it is possible that some of the MBMS service(s) that the UE is receiving or interested to receive are not available through p-t-m transmission or available only in different MBSFN area. It is up to UE to initiate p-t-p transmission for the MBMS service(s) that is not available through p-t-m transmission. The UE synchronizes with the target cell (716). The UE send RRC Connection Reconfiguration Complete to the target cell (718).

Figure 8:
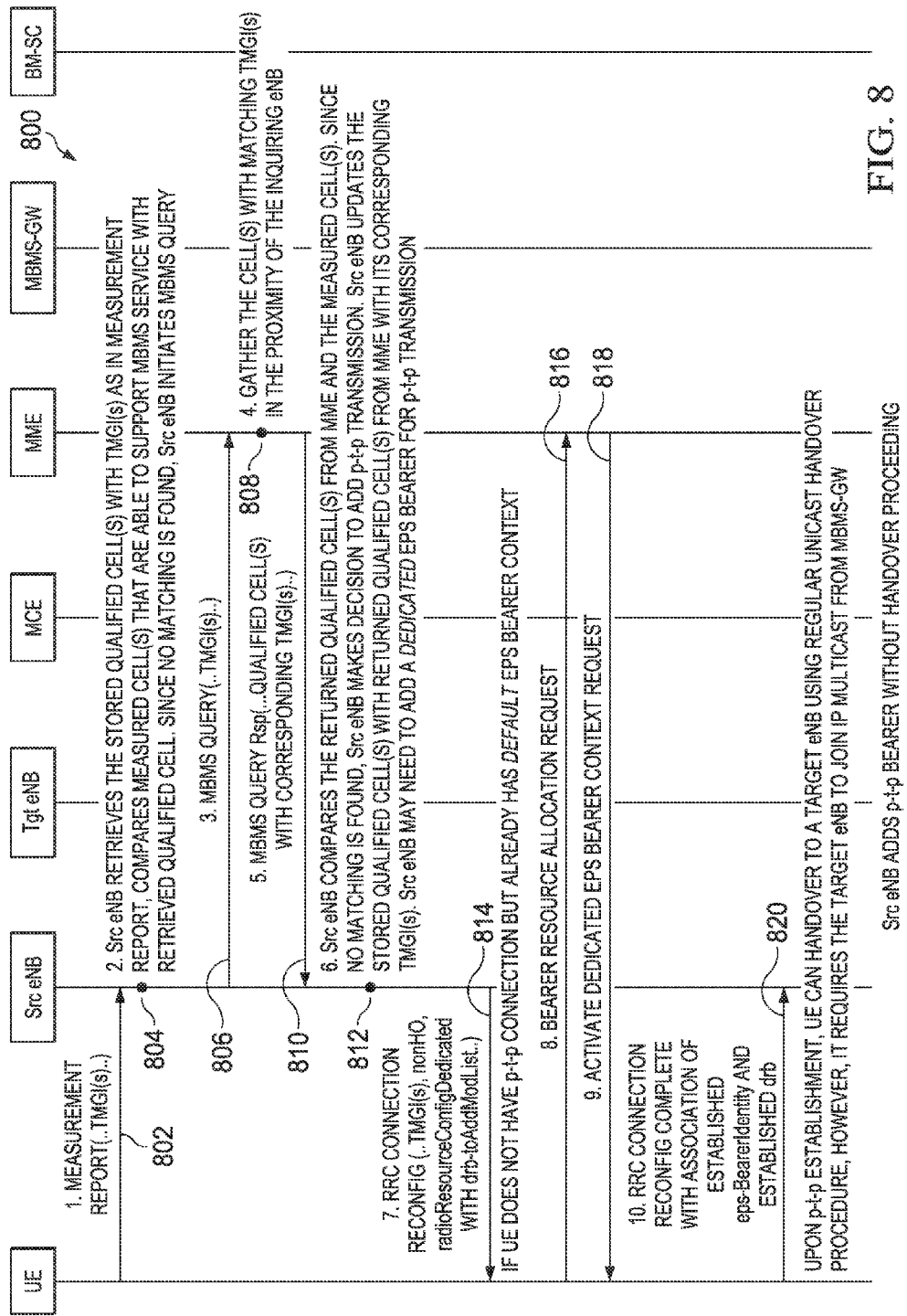
FIG. 8 is a swim-lane diagram for showing example process steps for an implementation of maintaining MBMS continuity.

FIG. 8 is a swim-lane diagram 800 for showing example process steps for an implementation of maintaining MBMS continuity. In FIG. 8, the MME returns qualified cell(s) and stored qualified cell(s) that do not match the measured cell(s), and a p-t-p transmission is added in the serving cell to improve reception at serving cell.

If the signal strength of the neighboring cell(s) reaches a certain threshold, UE sends measurement report to the source eNB or serving cell (802). If the UE is receiving or interested to receive MBMS session(s), the included MBSFN-AreaID(s)/TMGI(s) indicate the MBMS service(s) that the UE is receiving or interested to receive otherwise the MBSFN-AreaID or TMGI is set to "0." The source eNB retrieves the stored cells transmitting the same TMGI(s) as in the measurement report (qualified cell(s)) (804). In this scenario, there is no matching between the qualified cell(s) and the measured cell, which triggers the source eNB to initiate MBMS query in 806. The source eNB sends M2AP/M3AP MBMS Query to the MME (via MCE), with TMGI(s) similar to the TMGI(s) in the measurement report (806). The MME retrieves the cell(s) in the proximity of the inquiring eNB with the same TMGI(s) (the qualified cell(s)) (808). The MME returns the qualified cell(s) with its corresponding TMGI(s) in MBMS Query Response message to the eNB (810).

The source eNB matches the qualified cell(s) from the MME to the measured cell. Because a matching cell(s) is not found, the source eNB may initiate concurrent unicast transmission(s) to deliver the MBMS service(s) (812). Source eNB updates the stored qualified cell(s) with the qualified cell(s) from the MME when it is applicable, but will not forward the qualified cell(s) from MME to the target cell(s) because in this step the source eNB may not initiate a handover to a target cell. The source eNB sends RRC Connection Reconfiguration to the UE with a nonHO indicator to add unicast transmission in the serving cell (814). The RRC Connection Reconfiguration message will include the MBSFN-AreaID(s) or TMGI(s), so the UE knows that the additional unicast transmission in the serving cell is dedicated for MBMS session(s). The UE will combine the MBMS p-t-m and p-t-p transmission in the RLC layer. In case of more than one MBSFN(s) overlap in a cell and the UE can receive MBMS services from more than one MBSFN(s), the UE can add unicast for TMGI(s) within one MBSFN and keep receiving the multicast transmission from TMGI(s) within the other MBSFN(s).

Assuming that the UE has already established the default EPS bearer, the unicast transmission may require a new dedicated EPS bearer to be established. UE sends Bearer Resource Allocation request to the MME (816). The MME returns Activate Dedicated EPS Bearer Context Request (818). The UE sends RRC Connection Reconfiguration Complete message to eNB to indicate that the unicast bearer has been established and MBMS through p-t-p transmission can start (820). When the p-t-m transmission is getting worse, the UE may stop receiving the MBMS p-t-m transmission. The unicast transmission can then handover to a better cell as regular p-t-p transmission handover.

Figure 9:
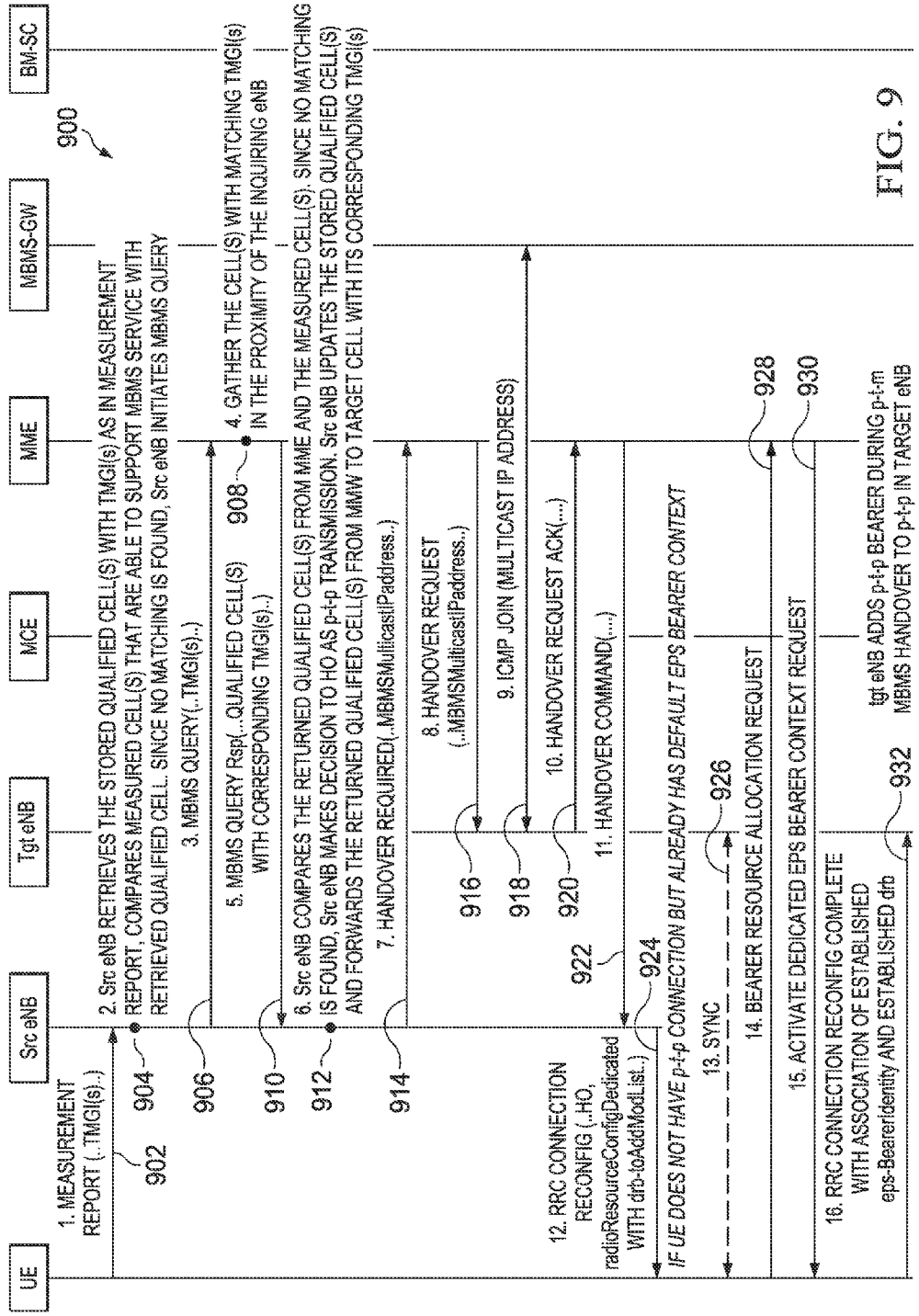
FIG. 9 is a swim-lane diagram for showing example process steps for an implementation of maintaining MBMS continuity.

FIG. 9 is a swim-lane diagram 900 for showing example process steps for an implementation of maintaining MBMS continuity. In FIG. 9, the MME returns qualified cell(s) and stored qualified cell(s) that do not match the measured cell, and p-t-p transmission is added at the target cell to handover to the target cell.

If the signal strength of the neighboring cell(s) reaches a certain threshold, UE sends measurement report to the source eNB or serving cell (902). If the UE is receiving or interested to receive MBMS session(s), the included MBSFN-AreaID(s) or TMGI(s) indicate the MBMS service(s) that the UE is receiving or interested to receive otherwise the TMGI is set to "0." The Source eNB retrieves the stored cells transmitting the same MBSFN-AreaID(s) or TMGI(s) as in the measurement report (qualified cell(s)) (904). There is no matching between the qualified cell(s) and the measured cell, triggering the Source eNB to initiate MBMS query in step 906. The Source eNB send M2AP/M3AP MBMS Query to the MME (via MCE), with MBSFN-AreaID(s) or TMGI(s) similar to the MBSFN-AreaID(s) or TMGI(s) in the measurement report (906). The MME retrieves the cell(s) in the proximity of the inquiring eNB with the same MBSFN-AreaID(s) or TMGI(s) (the qualified cell(s)) (908).

The MME returns the qualified cell(s) with its corresponding MBSFN-AreaID(s) or TMGI(s) in MBMS Query Response message to the eNB (910). The source eNB matches the qualified cell(s) from the MME to the measured cell (912). Because matching cell(s) is not found, source eNB may initiate concurrent unicast transmission(s) to deliver the MBMS service(s). Source eNB update the stored qualified cell(s) with the qualified cell(s) from the MME when it is applicable, and forward the qualified cell(s) from MME to the target cell(s). The S1AP Handover Required message includes the MBMS IP Multicast address (914). Alternatively, the S1AP Handover Required message includes the MBSFN-AreaID(s) or TMGI(s) and the MME will find the IP Multicast address of the MBMS session that the UE is joining.

The S1AP Handover Request message includes the MBMS IP Multicast address for the target eNB to join (916). The target eNB joins the IP multicast address and start receiving the MBMS traffic for that particular session (918). The target eNB returns the Handover Request Ack to the MME with the p-t-p radio resource dedicated for UE when the UE handoff to the target cell (920). The MME sends the S1AP Handover Command to the source eNB (922). The Source eNB sends RRC Connection Reconfiguration to the UE to start the handover procedure including the MBSFN-AreaID(s) or TMGI(s), so the UE knows that in the target cell the UE will receive the MBMS session(s) (924). In case of more than one MBSFN(s) overlap in a cell and the UE can receive MBMS services from more than one MBSFN(s), the UE can handover unicast transmission for MBSFN-AreaID or TMGI(s) within one MBSFN and keep receiving the multicast transmission from MBSFN-AreaID(s) or TMGI(s) within the other MBSFN(s).

The UE synchronizes with the target cell (926). Assuming that the UE has already established the default EPS bearer, the unicast transmission may require a new dedicated EPS bearer to be established (928). UE sends Bearer Resource Allocation request to the MME. The MME returns Activate Dedicated EPS Bearer Context Request (930). The UE sends RRC Connection Reconfiguration Complete message to eNB to indicate that the unicast bearer has been established and MBMS delivery through p-t-p transmission can start (932).

The IE PMCH-InfoList specifies configuration of all PMCHs of an MBSFN area. The information provided for an individual PMCH includes the configuration parameters of the sessions that are carried by the concerned PMCH.

```
PMCH-InfoList information element

-- ASN1START
PMCH-InfoList-r9 ::=           SEQUENCE (SIZE (0..maxPMCH-PerMBSFN)) OF PMCH-Info-r9
PMCH-Info-r9 ::=               SEQUENCE {
    pmch-Config-r9                 PMCH-Config-r9,
    mbms-SessionInfoList-r9        MBMS-SessionInfoList-r9,
    ...
}
MBMS-SessionInfoList-r9 ::=    SEQUENCE (SIZE (0..maxSessionPerPMCH)) OF MBMS-SessionInfo-r9
MBMS-SessionInfo-r9 ::=        SEQUENCE {
    tmgi-r9                        TMGI-r9,
    sessionId-r9                   OCTET STRING (SIZE (1))   OPTIONAL,   -- Need OR
    startTime-r11                  BIT STRING (SIZE (48))
    logicalChannelIdentity-r9      INTEGER (0..maxSessionPerPMCH-1),
    ...
}
PMCH-Config-r9 ::=             SEQUENCE {
    sf-AllocEnd-r9                 INTEGER (0..1535),
    dataMCS-r9                     INTEGER (0..28),
    mch-SchedulingPeriod-r9        ENUMERATED {
                                       rf8, rf16, rf32, rf64, rf128, rf256, rf512, rf1024},
    ...
}
TMGI-r9 ::=                    SEQUENCE {
    plmn-Id-r9                     CHOICE {
        plmn-Index-r9                  INTEGER (1..6),
        explicitValue-r9               PLMN-Identity
    },
    serviceId-r9                   OCTET STRING (SIZE (3))
}
-- ASN1STOP
```

PMCH-InfoListfield descriptions dataMCS Indicates the value for parameter $I^{MCS}$ in TS 36.213 [23, Table 7.1.7.1-1], which defines the Modulation and Coding Scheme (MCS) applicable for the subframes of this (P)MCH as indicated by the field commonSF-Alloc. The MCS does however neither apply to the subframes that may carry MCCH i.e., the subframes indicated by the field sf-AllocInfo within SystemInformationBlockType13 nor for the first subframe allocated to this (P)MCH within each MCH scheduling period (which may contain the MCH scheduling information provided by MAC).
mch-SchedulingPeriod Indicates the MCH scheduling period i.e., the periodicity used for providing MCH scheduling information at lower layers (MAC) applicable for an MCH. Value rf8 corresponds to 8 radio frames, rf16 corresponds to 16 radio frames and so on. The mch-SchedulingPeriod starts in the radio frames for which: SFN mod mch-SchedulingPeriod = 0.
plmn-Index Index of the entry in field plmn-IdentityList within SystemInformationBlockType1.

sessionId Indicates the optional MBMS Session Identity, which together with TMGI identifies a transmission or a possible retransmission of a specific MBMS session: see TS 29.061 [51, Sections 20.5, 17.7.11, 17.7.15]. The field is included whenever upper layers have assigned a session identity i.e., one is available for the MBMS session in E-UTRAN.
serviceId Uniquely identifies the identity of an MBMS service within a PLMN. The field contains octet 3-5 of the IE Temporary Mobile Group Identity (TMGI) as defined in TS 24.008 [49]. The first octet contains the third octet of the TMGI, the second octet contains the fourth octet of the TMGI and so on.
sf-AllocEnd Indicates the last subframe allocated to this (P)MCH within a period identified by field commonSF-AllocPeriod. The subframes allocated to (P)MCH corresponding with the $n^{th}$ entry in pmch-InfoList are the subsequent subframes starting from either the next subframe after the subframe identified by sf-AllocEnd of the $(n-1)^{th}$ listed (P)MCH or, for n = 1, the first subframe defined by field commonSF-Alloc, through the subframe identified by sf-AllocEnd of the $n^{th}$ listed (P)MCH. Value 0 corresponds with the first subframe defined by field commonSF-Alloc.
startTime The IE startTime indicates an absolute time MBMS session start time in a format YY-MM-DD HH:MM:SS and using BCD encoding. The first/leftmost bit of the bit string contains the most significant bit of the most significant digit of the year and so on Modification of Measurement Report by adding the MBSFNAreaID or TMGI(s) of the MBMS service(s) that the UE is receiving or interested to receive as shown below

```
MeasResultListEUTRA ::=             SEQUENCE (SIZE (1..maxCellReport)) OF MeasResultEUTRA
MeasResultEUTRA ::= SEQUENCE {
    physCellId                      PhysCellId,
    cgi-Info                        SEQUENCE {
        cellGlobalId                    CellGlobalIdEUTRA,
        trackingAreaCode                TrackingAreaCode,
        plmn-IdentityList               PLMN-IdentityList2          OPTIONAL
    }                               OPTIONAL,
    measResult                      SEQUENCE {
        rsrpResult                      RSRP-Range                  OPTIONAL,
        rsrqResult                      RSRQ-Range                  OPTIONAL,
        ...,
        [[ additionalSI-Info-r9             AdditionalSI-Info-r9    OPTIONAL
        ]]
        mbms-service-id-r11 ::=     CHOICE {
            TMGIs ::=                   SEQUENCE (SIZE(1..maxMBMStmgiReceived)) {
                tmgi-r9                     TMGI-r9
            },
            MBMS-service-id ::=         SEQUENCE (SIZE(1..maxMBSFNareaReceived) ) {
                MBSFN-AreaID-r9             INTEGER (0..255)
            }
        }
    }
}
```

The TMGI coding is defined in 3GPP TS 24.008 v.10.1.0 section 10.5.6.13 without MCC and MNC (octet 6 through 8). The eNB may consider the TMGIs in the Measurement Report from UE Rel.11 and beyond when the maxMBMStmgi is not '0.'

The MobilityControlInfo IE in the RRC Connection Reconfiguration message is modified to include MBSFN-AreaID(s) or TMGI(s) of the MBMS service(s) that the target cell can provide to the UE, which could be all or part of MBSFN-AreaID(s) or TMGI(s) that the serving cell received from UE in the Measurement Report. When no MBSFN-AreaID or TMGI is included, the target cell may not be able to provide any MBMS service at all.

```
MobilityControlInfo ::=     SEQUENCE {
    targetPhysCellId            PhysCellId, mbms-service-id-r11 ::=   CHOICE {
        TMGIs ::=                   SEQUENCE (SIZE(1..maxMBMStmgiReceived)) {
            tmgi-r9                     TMGI-r9,
            startTime                   BIT STRING (SIZE (48))
        },
        MBMS-service-id ::=         SEQUENCE (SIZE(1..maxMBSFNareaReceived) ) {
            MBSFN-AreaID-r9             INTEGER (0..255)
        }
    },
    carrierFreq                 CarrierFreqEUTRA                OPTIONAL,   -- Cond HO-toEUTRA
    carrierBandwidth            CarrierBandwidthEUTRA           OPTIONAL,   -- Cond HO-toEUTRA
    additionalSpectrumEmission  AdditionalSpectrumEmission      OPTIONAL,   -- Cond HO-toEUTRA
    t304                        ENUMERATED {
                                    ms50, ms100, ms150, ms200, ms500, ms1000,
                                    ms2000, spare1},
    newUE-Identity              C-RNTI,
    radioResourceConfigCommon   RadioResourceConfigCommon,
    rach-ConfigDedicated        RACH-ConfigDedicated            OPTIONAL,   -- Need OP
    ...
}
CarrierBandwidthEUTRA ::=   SEQUENCE {
    dl-Bandwidth                ENUMERATED {
                                    n6, n15, n25, n50, n75, n100, spare10,
                                    spare9, spare8, spare7, spare6, spare5,
                                    spare4, spare3, spare2, spare1},
    ul-Bandwidth                ENUMERATED {
                                    n6, n15, n25, n50, n75, n100, spare10,
                                    spare9, spare8, spare7, spare6, spare5, spare4,
                                    spare3, spare2, spare1} OPTIONAL -- Need OP
}
CarrierFreqEUTRA ::=        SEQUENCE {
    dl-CarrierFreq              ARFCN-ValueEUTRA,
    ul-CarrierFreq              ARFCN-ValueEUTRA                OPTIONAL    -- Cond FDD
}
```

Similarly, the TMGI coding is defined in 3GPP TS 24.008 v.10.1.0 section 10.5.6.13 without MCC and MNC. The eNB will provide the TMGIs in the MobilityControlInfo IE in RRC Connection Reconfiguration to UE Rel.11 and above.

The IE SystemInformationBlockType13 contains the information required to acquire the MBMS control information associated with one or more MBSFN areas.

| SystemInformationBlockType13 information element |
| --- |
| -- ASN1START |
| SystemInformationBlockType13-r9 ::= SEQUENCE { |
|     MBSFN-AreaInfoList-r9    MBSFN-AreaInfoList-r9, |
|     SAI    tbd |
|     ARFCN    tbd |
|     notificationConfig-r9    MBMS-NotificationConfig-r9, |
|     lateNonCriticalExtension    OCTET STRING   OPTIONAL,   -- Need OP |
|     ... |
| } |
| -- ASN1STOP |

The source eNB does not know its neighboring eNB MBSFN(s)/TMGI(s) status. This example uses a new query message from eNB to the MCE over M2AP interface. The other alternative is for the MCE to tell each eNB under its domain the MBSFN(s)/TMGI(s) status of every other eNB under the domain, using a new MBSFN Information broadcast message, after completion of an MBMS service initialization. Each eNB selectively store the received information relevant to its neighbor eNBs only. If dynamic individual cell joining/leaving the MBSFN is allowed in the future, the MBSFN Information message must be re-broadcast upon the completion of the MBSFN modification. It is assumed that MBMS service termination through MBMS Session Stop Request is valid for all cells in the MBSFN and no MBSFN Information re-broadcast is necessary.

The MBMS query message is sent by the eNB to MCE to query the MBSFN status of its neighboring eNBs relevant to the TMGI(s).

| | | | | | | |
| --- | --- | --- | --- | --- | --- | --- |
| Direction: eNB → MCE. | | | | | | |
| IE/Group Name | Presence | Range | IE type and reference | Semantics description | Criticality | Assigned Criticality |
| Message Type | M | | 9.2.1.1 | | YES | reject |
| MCE MBMS M2AP ID | M | | 9.2.3.1 | | YES | ignore |
| eNB MBMS M2AP ID | M | | 9.2.3.2 | | YES | ignore |
| TMGI(s) or MBSFN-AreaID | O | | 9.a.b.c | | YES | ignore |
| Criticality Diagnostics | O | | 9.2.1.7 | | YES | ignore |

The MCE knows the querying eNB from the MCE MBMS M2AP ID and eNB MBMS M2AP ID. The MBSFN-AreaID(s) or TMGI(s) comes from the UE that is included in the Measurement Report.

The query response contains the neighbor eNBs to the querying eNB that has the same MBSFN-AreaID or TMGI(s) that provides the same MBMS service. The Query response is not necessary if the MBMS Information broadcast message is adopted.

The MBMS query response is sent by the MCE to respond to the MBMS Query message

| IE/Group Name | Presence | Range | IE type and reference | Semantics description | Criticality | Assigned Criticality |
|---|---|---|---|---|---|---|
| Direction: MCE → eNB. | | | | | | |
| Message Type | M | | 9.2.1.1 | | YES | reject |
| MCE MBMS M2AP ID | M | | 9.2.3.1 | | YES | ignore |
| eNB MBMS M2AP ID | M | | 9.2.3.2 | | YES | ignore |
| Neighboring eNB | | | | | | |
| CGI | O | | 9.w.w.w | | YES | ignore |
| Frequency | O | | 9.x.x.x | | YES | Ignore |
| TMGI or MBSFN-AreaID | O | | 9.y.y.y | | YES | ignore |
| startTime | O | | 9.z.z.z | | YES | ignore |
| Criticality Diagnostics | O | | 9.2.1.7 | | YES | ignore |

In case none of the neighboring eNB is part of the MBSFN or TMGI in the query (the MBMS Query Response does not return any neighbor eNB, the serving eNB may decide to handover the UE to the strongest cell and to continue MBMS service(s) through p-t-p. This requires the target eNB to join the MBMS multicast from the BM-SC. The source eNB provide the IP multicast address for the target cell to join.

The Handover Required message is sent by the source eNB to the MME to request the preparation of resources at the target.

| IE/Group Name | Presence | Range | IE type and reference | Semantics description | Criticality | Assigned Criticality |
|---|---|---|---|---|---|---|
| Direction: eNB → MME | | | | | | |
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| Handover Type | M | | 9.2.1.13 | | YES | reject |
| Cause | M | | 9.2.1.3 | | YES | ignore |
| Target ID | M | | 9.2.1.6 | | YES | reject |
| Direct Forwarding Path Availability | O | | 9.2.3.15 | | YES | ignore |
| SRVCC HO Indication | O | | 9.2.1.59 | | YES | reject |
| Source to Target Transparent Container | M | | 9.2.1.56 | | YES | reject |
| Source to Target Transparent Container Secondary | O | | | Source to Target Transparent Container 9.2.1.56 | YES | reject |
| MS Classmark 2 | C-ifSRVCCtoGERAN | | 9.2.1.64 | | YES | reject |
| MS Classmark 3 | C-ifSRVCCtoGERAN | | 9.2.1.65 | | YES | ignore |
| CSG Id | O | | 9.2.1.62 | | YES | reject |
| Cell Access Mode | O | | 9.2.1.74 | | YES | reject |
| PS Service Not Available | O | | 9.2.1.77 | | YES | ignore |
| p-t-m to p-t-p switch | O | 1 | | | YES | reject |
| >IP Multicast Address | O | | IP Address 9.2.2.1 | | — | |
| >IP Source Address | O | | IP Address 9.2.2.1 | | — | |
| Qualified cell(s) | O | | | | YES | reject |
| >CGI | O | | 9.x.x.x | | | |
| >related MBSFN-AreaID or TMGI(s) | O | | 9.y.y.y | | | |

The Handover Request message is sent by the MME to the target eNB to request the preparation of resources.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 to <maxnoof E-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs | — | |
| >>E-RAB Level QoS Parameters | M | | 9.2.1.15 | Includes necessary QoS parameters | — | |
| >>Data Forwarding Not Possible | O | | 9.2.1.76 | | YES | ignore |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffromUTRA NGERAN | | 9.2.3.31 | The eNB shall use this IE as specified in [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE | YES | reject |
| MME UE S1AP ID 2 | O | | 9.2.3.3 | This IE indicates the MME UE S1AP ID assigned by the MME | YES | reject |
| p-t-m to p-t-p switch | | 1 | | | YES | reject |
| >IP Multicast Address | M | | IP Address 9.2.2.1 | | — | |
| >IP Source Address | M | | IP Address 9.2.2.1 | | — | |
| Qualified cell(s) | O | | | | YES | reject |
| >CGI | O | | 9.x.x.x | | | |
| >related TMGI(s) or MBSFN-AreaID | O | | 9.y.y.y | | | |

Direction: MME → eNB.

The newly received neighbor eNBs information from the MCE or MME is used to update the stored neighbor eNBs information in the source eNB, then forwarded to the target eNB to update the neighbor eNB information in the target eNB. The forwarding of the neighbor eNB information can be included in the Handover Required and Handover Request, or X2AP new message. Handover Required and/or Handover Request can be used to transport the neighbor eNB(s) information to the target cell.

While this disclosure contains many specifics, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations.

Other implementations fall within the scope of the following claims.

What is claimed is:

1. A computer implemented method in a communications network, the method comprising:
   determining, at a source base station, that a user equipment (UE) is near a cell edge of a source base station, the UE receiving a multimedia broadcast multicast service (MBMS), wherein determining that UE is near the cell edge comprises receiving, from the UE, a measurement report, the measurement report including a multicast-broadcast single-frequency network (MBSFN) area identifier (MBSFN-AreaID) indicative of the MBMS that the UE is currently receiving;
   identifying, at the source base station, a target base station based, at least in part, on the MBMS; and
   providing, by the source base station, an indication of the target base station to the UE.

2. The method of claim 1, wherein the UE is in RRC (Radio Resource Control) connected mode, and the method further comprises initiating a handover procedure for the UE to the target base station.

3. The method of claim 1, wherein the UE is in RRC idle mode, and the method further comprises initiating a cell selection procedure for the UE to select the target base station.

4. The method of claim 1, wherein the measurement report includes a temporary multicast group identity (TMGI) indicator.

5. The method of claim 1, wherein the measurement report includes an identification of a base station that has the same MBSFN-AreaID as the UE that is receiving the MBMS service.

6. The method of claim 1, wherein identifying the target base station based on the MBMS comprises:
   identifying, at the source base station, one or more base stations that have the same MBSFN-AreaID; and
   selecting, at the source base station, the target base station from among the identified one or more base stations based, at least in part, on a signal strength of the target base station.

7. The method of claim 1, wherein identifying the target base station based on the MBMS comprises:
   sending a MBSFN area identifier (MBSFN-AreaID) of one or more neighboring base stations to the UE;
   receiving from the UE an identification of one or more base stations that have the same MBSFN-AreaID; and
   selecting the target base station from among the identified one or more neighboring base stations based, at least in part, on a signal strength of the one or more neighboring base stations and the MBSFN-AreaID.

8. The method of claim 1, wherein identifying the target base station based on the MBMS comprises:
   receiving a temporary multicast group identity indicator (TMGI) from the UE;
   identifying one or more base stations that transmit the same TMGI indicator received from the UE; and
   selecting the target base station from among the identified one or more base stations based, at least in part, on a signal strength of the target base station.

9. The method of claim 1, wherein identifying the target base station based on the MBMS comprises initiating an MBMS query procedure to identify the target base station based, at least in part, on an MBMS service identifier.

10. The method of claim 1, wherein identifying the target base station based on the MBMS comprises initiating an MBMS query procedure to identify one or more base stations based on a temporary multicast group identity (TMGI) similar to or the same as a TMGI of the source base station and the proximity of the target base station relative to the source base station.

11. The method of claim 1, wherein providing the target base station to the UE comprises providing a temporary multicast group identity indicator (TMGI) of the target base station to the UE.

12. The method of claim 1, wherein identifying the target base station based, at least in part, on the MBMS comprises initiating an MBMS query procedure to identify one or more base stations based, at least in part, on a MBSFN area identifier (MBSFN-AreaID) similar to or the same as an MBSFN-AreaID of the source base station and the proximity of the target base station relative to the source base station.

13. The method of claim 1, wherein providing the target base station to the UE comprises providing a MBSFN area identifier (MBSFN-AreaID) of the target base station to the UE.

14. A method performed at a user equipment (UE) in a wireless communications network, the method comprising:
   communicating a measurement report to a first base station, the measurement report including an indication of a multimedia broadcast multicast service (MBMS) provided to the UE by the first base station, wherein the indication of the MBMS includes a multimedia broadcast single frequency network area identifier (MBSFN-AreaID) indicative of the MBMS that the UE is currently receiving; and
   receiving a message from the first base station, the message including an identifier of a second base station, the second base station having the same MBSFN-AreaID indicative of the MBMS that the UE is currently receiving.

15. The method of claim 14, wherein the UE is in RRC (Radio Resource Control) connected mode and the message is a RRC connection reconfiguration message.

16. The method of claim 14, wherein the message includes a start time associated with the MBMS.

17. The method of claim 14, wherein the message includes an indication of an MBMS service available for the UE from the second base station.

18. The method of claim 14, wherein the indication of the MBMS is a temporary multicast group identity (TMGI).

19. A user equipment (UE) comprising:
a transceiver configured to facilitate wireless communications between the UE and a first base station of the wireless communications network; and
a hardware processor configured to execute instructions comprising:
  communicating a measurement report to the first base station, the measurement report including multimedia broadcast multicast service (MBMS) identifier associated with an MBMS for the UE, wherein the MBMS identifier comprises a multimedia broadcast single frequency network area identifier (MBSFN-AreaID) indicative of the MBMS that the UE is currently receiving; and
  receiving a message from the first base station, the message including an identifier of a second base station, the second base station having same MBSFN-AreadID indicative of the MBMS that the UE is currently receiving.

20. The UE of claim 19, wherein the MBMS identifier for the UE is a temporary multicast group identity (TMGI).

21. The UE of claim 19, wherein receiving a message from the first base station comprises receiving a message that includes a TGMI of a second base station.

22. The UE of claim 19, wherein receiving a message from the first base station comprises receiving a message that includes an MBSFN-AreaID of a second base station.

23. The UE of claim 19 wherein the instructions further comprise:
  identifying one or more neighboring base stations that transmit the same MBMS identifier received from the first base station as the UE; and
  identifying a base station from among the one or more neighboring base stations having the same MBMS identifier based, at least in part, on a signal strength of the target base station to be included in the measurement report.

* * * * *

UNITED STATES PATENT AND TRADEMARK OFFICE
CERTIFICATE OF CORRECTION

PATENT NO.        : 8,750,181 B2
APPLICATION NO.   : 13/471144
DATED             : June 10, 2014
INVENTOR(S)       : Rene Purnadi and Zhijun Cai It is certified that error appears in the above-identified patent and that said Letters Patent is hereby corrected as shown below:

In the Claims:

In Column 35, In Line 17-18, In Claim 19, delete "AreadID" and insert -- AreaID --, therefor.

In Column 36, In Line 5, In Claim 21, delete "TGMI" and insert -- TMGI --, therefor.

Signed and Sealed this
Sixteenth Day of September, 2014

Michelle K. Lee
*Deputy Director of the United States Patent and Trademark Office*